US010064465B2

(12) United States Patent
Pan et al.

(10) Patent No.: US 10,064,465 B2
(45) Date of Patent: Sep. 4, 2018

(54) OPENING AND CLOSING STRUCTURE FOR UMBRELLA COMBINING AUTOMATIC AND NON-AUTOMATIC MODES

(71) Applicant: Zhejiang Yotrio Group Co., Ltd., Linhai (CN)

(72) Inventors: Jiangbo Pan, Linhai (CN); Weijie Wei, Linhai (CN)

(73) Assignee: ZHEJIANG YOTRIO GROUP CO., LTD., Linhai (CN)

( * ) Notice: Subject to any disclaimer, the term of this patent is extended or adjusted under 35 U.S.C. 154(b) by 0 days.

(21) Appl. No.: 15/590,624

(22) Filed: May 9, 2017

(65) Prior Publication Data

US 2017/0332749 A1 Nov. 23, 2017

(30) Foreign Application Priority Data

May 19, 2016 (CN) .......................... 2016 2 0465113

(51) Int. Cl.
*A45B 25/14* (2006.01)
*E04H 15/28* (2006.01)
*A45B 25/00* (2006.01)
*A45B 25/16* (2006.01)
*F16H 25/20* (2006.01)
*A45B 23/00* (2006.01)

(52) U.S. Cl.
CPC ............ *A45B 25/14* (2013.01); *A45B 25/006* (2013.01); *A45B 25/143* (2013.01);
(Continued)

(58) Field of Classification Search
CPC . A45B 25/14; A45B 25/143; A45B 2025/146; A45B 7/005; E04H 14/28;
(Continued)

(56) References Cited

U.S. PATENT DOCUMENTS 3,129,715 A * 4/1964 Militano ................ A45B 17/00
135/20.3
4,622,987 A * 11/1986 Redl ...................... A45B 17/00
135/20.3
(Continued)

FOREIGN PATENT DOCUMENTS

CN 101999785 A 4/2011

*Primary Examiner* — Winnie Yip
(74) *Attorney, Agent, or Firm* — Perkins Coie LLP

(57) ABSTRACT

An opening and closing structure for an umbrella combining automatic and non-automatic modes including an electric mechanism, a cranking mechanism and a clutch structure is described herein. The electric mechanism includes a screw rod, a motor and a first transmission element. The motor is configured to drive rotation of the screw rod, and the first transmission element is mounted at the screw rod. The cranking mechanism includes a second transmission element and a cranking handle. The second transmission element is engaged with the first transmission element, and the second transmission element is connected with the cranking handle via the clutch structure. The invention overturns a conventional method of using an electric umbrella, and provides a manual lifting-and-lowering function under the premise of maintaining a electric lifting-and-lowering function, that is, in case of insufficient or no power supply, the umbrella can be opened and closed through the cranking handle.

15 Claims, 13 Drawing Sheets

(52) U.S. Cl.
CPC ........... *A45B 25/165* (2013.01); *E04H 15/28* (2013.01); *F16H 25/20* (2013.01); *A45B 2023/0006* (2013.01); *A45B 2025/003* (2013.01); *F16H 2025/204* (2013.01); *F16H 2025/209* (2013.01); *F16H 2025/2065* (2013.01); *F16H 2025/2071* (2013.01); *F16H 2025/2075* (2013.01); *F16H 2025/2093* (2013.01)

(58) Field of Classification Search
CPC ......... F16H 2025/204; F16H 2025/209; F16H 2025/2075
USPC ...................................... 135/16, 98, 20.3, 22
See application file for complete search history.

(56) References Cited

U.S. PATENT DOCUMENTS

| | | | |
|---|---|---|---|
| 5,711,333 A * | 1/1998 | Vanderminden, Sr. | A45B 17/00 135/20.1 |
| 6,182,917 B1 * | 2/2001 | Lai | A45B 25/14 135/20.3 |
| 6,622,741 B2 * | 9/2003 | Lai | A45B 17/00 135/20.3 |
| 6,722,381 B2 * | 4/2004 | Lai | A45B 25/14 135/20.3 |
| 7,111,954 B1 * | 9/2006 | Lai | A45B 3/04 362/102 |
| 7,188,633 B2 * | 3/2007 | Zerillo | A45B 25/143 135/16 |
| 7,406,976 B1 * | 8/2008 | Chan | A45B 25/14 135/16 |
| 7,412,985 B2 * | 8/2008 | Ma | A45B 17/00 135/20.1 |
| 7,562,666 B2 * | 7/2009 | Chan | A45B 25/143 135/16 |
| 8,763,620 B1 * | 7/2014 | Tung | A45B 25/14 135/20.1 |

* cited by examiner

OPENING AND CLOSING STRUCTURE FOR UMBRELLA COMBINING AUTOMATIC AND NON-AUTOMATIC MODES

CROSS-REFERENCE TO RELATED APPLICATIONS

This Non-provisional application claims priority under 35 U.S.C. § 119(a) on Patent Application No(s). 201620465113.3 filed in People's Republic of China on May 19, 2016, the entire contents of which are hereby incorporated by reference.

BACKGROUND OF THE INVENTION

Field of the Invention

Belonging to a technical field of sunshade, the present invention relates to a sunshade, and more especially, relates to an opening and closing structure for an umbrella combining automatic and non-automatic modes applied to a sunshade.

Description of the Related Art

As modem daily appliances, umbrellas can roughly be divided into folded ones and straight ones. With the progress of the times, umbrellas with automatic opening and closing functions have been unveiled. With regard to the structure for an umbrella with automatic opening and closing functions, the design for the structure of a folded umbrella is easier to achieve due to the short stroke distance of its opening and closing movement, but for a straight umbrella with a long stroke distance of opening and closing movement, its structure is more difficult to achieve. An application which Publication Number is CN101999785A discloses an electric umbrella, including a movable rod and a tubular umbrella column. A lower end of the movable rod extends into the umbrella column and an upper end of the movable rod is fixedly connected with an upper umbrella plate, the umbrellacolumn is sleeved with a lower umbrella plate, and the upper umbrella plate and the lower umbrella plateare connected with an umbrella rib. An upper end of the umbrella column is fixedly provided with a pulley structures, the pulley structures are all connected with a rope, and the lower end of the movable rod is provided with a center hole, one end of the rope is connected and passes through the center hole, while the other end respectively fixed onto the lower umbrella plate. A transmission mechanism, a motor, and a control panel respectively connected with the motor are mounted in the umbrella column, wherein the transmission mechanism is fixed to the lower end of the movable rod and the motor's output shaft is connected with the transmission mechanism and capable of driving the movable rod to slide up and down through the transmission mechanism. However, an umbrella with this structure is difficult to manufacture due to the complexity of the structure and high costs. Nowadays, some electric sunshades are getting popular and are widely used in outdoor areas of venues such as beaches, villas, swimming pools and coffee shops, but the electric umbrellas are driven by a motor, so when there is no external power supply or no adequate battery charging, it is impossible to realize the electric opening and closing functions.

BRIEF SUMMARY OF THE INVENTION

To solve the above problem in the prior art, the objective of the present invention is to provide an opening and closing structure for an umbrella combining automatic and non-automatic modes, and the technical problem it needs to solve is how to realize the opening and closing operations of an electric umbrella in the case of low power.

To achieve the above objective, the present invention adopts the following technical solution.

An opening and closing structure for an umbrella combining automatic and non-automatic modes, includes an electric mechanism, a cranking mechanism and a clutch structure. The electric mechanism and the cranking mechanism are configured to open and close the umbrella, respectively. The electric mechanism includes a screw rod, a motor and a first transmission element. The motor is configured to drive rotation of the screw rod, and the first transmission element is mounted at the screw rod. The cranking mechanism includes a second transmission element and a cranking handle. The second transmission element is engaged with the first transmission element, and the second transmission element is connected with the cranking handle via the clutch structure.

In case of the umbrella is under normal power supply, the clutch structure is in a dissociated state, so that the umbrella is opened and closed via the electric mechanism, that is, the motor drives the screw rod to rotate, and then the screw rod drives an umbrella's plate or an inner tube to rise and fall so as to realize opening and closing of the umbrella. In case of no external power supply or shortage of battery charging, the motor cannot start, and the clutch structure is adjusted to the associated state. In this case, the cranking handle can drive the second transmission element to rotate, so that the second transmission element drives the first transmission element to rotate via engagement, and then the first transmission element drives the screw rod to rotate so as to realize the opening and closing operations of the umbrella. The umbrella can be opened and closed automatically or manually, and meanwhile the two operating modes can be switched via the clutch structure, without interfering with each other.

In one embodiment of the invention, the opening and closing structure for the umbrella combining automatic and non-automatic modes may further include a tubular umbrella rod. The cranking mechanism may further include a cranking handle shell mounted on the umbrella rod. The first transmission element and the second transmission element may be both tapered gears. The second transmission element may be rotatably mounted in the cranking handle shell. The clutch structure may include a drive shaft, an elastic reset element, and a control element. The drive shaft may be rotatably mounted in the cranking handle shell and capable of sliding along an axial direction of the drive shaft. An axis of the drive shaft may coincide with an axis of the second transmission element. One end of the drive shaft may be clutchably connected with the second transmission element, and the other end of the drive shaft may be connected with the cranking handle and driven by the cranking handle to rotate. The elastic reset element may be capable of driving the drive shaft to slide away from the second transmission element in cooperation with the drive shaft so as to maintain the drive shaft and the second transmission element in a dissociated state. The control element may be configured to control the drive shaft to slide toward the second transmission element so as to maintain the drive shaft and the second transmission element in an associated state.

By operating the control element, the drive shaft can be driven to slide toward the second transmission element, and then the drive shaft is coupled to the second transmission element. In this case, the second transmission element can be driven by the cranking handle to rotate, so that an electric mode of opening the umbrella is switched to a manual mode. When the control element is not subjected to an external force, the drive shaft will be separated from the second transmission element under an action of the elastic reset element, in this case, the cranking handle cannot drive the second transmission element to rotate, so that the manual mode of opening the umbrella is switched to the electric mode. There are many clutching connection forms between the drive shaft and the transmission element, such as an inserting fit, engagement, interference fit and matching up with a resistance plate, etc. The control element also has various structures, such as a press rod slidably disposed at the cranking handle shell and abutted against the drive shaft, or a press piece connected with a side wall of the drive shaft, which are all feasible as long as they can overcome an elasticity of the elastic reset element to drive the drive shaft to slide toward the second transmission element.

In practical use, the elastic reset element may be an elastic element such as a tension spring or a torsion spring.

In one embodiment of the invention, the control element may include a sliding element and a button. The sliding element may be slidably mounted in the cranking handle shell, and a sliding direction of the sliding element may remain the same as a longitudinal direction of the drive shaft. The sliding element may have a first drive surface disposed obliquely relative to the sliding direction of the sliding element. The button may be slidably mounted at the cranking handle shell, and the button may have a second drive surface slidably abutted against the first drive surface. When provided with force, the button may be configured to drive the sliding element to slide, and when driven by the button, the sliding element may cooperate with the drive shaft to drive the drive shaft to slide toward the second transmission element.

The second drive surface of the button is obliquely disposed and contacts the first drive surface via oblique surfaces. When the button is pressed, the second drive surface slides relative to the first drive surface and pushes the sliding element to slide so as to drive the drive shaft to slide toward the second transmission element, so that the electric mode of opening an umbrella is switched to the manual mode.

In one embodiment of the invention, the sliding element may include a first sliding block and a second sliding block. The first sliding block and the second sliding block may be enclosed as an annular shape. The sliding element may be sleeved on the umbrella rod. The first drive surface may be located on the first sliding block. One side far away from the second transmission element of the drive shaft may be abutted against an inside wall of the second sliding block. The cranking handle may have a rotating axis, and the rotating axis may pass through the second sliding block and then be connected with the drive shaft. A side wall of the cranking handle shell may have a through-hole. The button may include a pressed part and a disengagement prevention part. The pressed part may be movably disposed in the through-hole, the disengagement prevention part may be connected to the pressed part, and the second drive surface may be located on the disengagement prevention part.

The drive shaft is driven by the sliding element to move, and a moving stroke of the drive shaft is limited by the sliding element.

In one embodiment of the invention, the screw rod may be located in the umbrella rod and disposed along a longitudinal direction of the umbrella rod. The electric mechanism may further include a screw rod bearing seat, a screw rod connector and a first bearing. The screw rod bearing seat and the screw rod connector may be disposed between the screw rod and the motor. An upper end of the screw rod connector may be fixedly connected with the screw rod, and a lower end of the screw rod connector may be connected with the motor. The screw rod connector may be rotatably mounted at the screw rod bearing seat via the first bearing.

The cranking mechanism may further include a tapered-gear bearing seat, a first bearing seat, a second bearing seat, and a second bearing. The tapered-gear bearing seat, the first bearing seat and the second bearing seat may be successively fixedly connected to a side wall of the screw rod bearing seat. The second bearing may be sleeved on the second transmission element, and mounted in the tapered-gear bearing seat. The second bearing seat may be sleeved on the first bearing seat, and the drive shaft may be interspersed in the first bearing seat and the second bearing seat. A side wall of the drive shaft may have a positioning convex edge, and the second sliding block may be abutted against the positioning convex edge. The elastic reset element may be a reset spring, and the elastic reset element may be sleeved on the first bearing seat and located in the second bearing seat. One end of the elastic reset element may be abutted against the positioning convex edge, and the other end of the elastic reset element may be abutted against the second bearing seat.

By setting the positioning convex edge, the elastic reset element and the second sliding block can easily match up with the drive shaft to ensure a reliable operation of the clutch structure.

In one embodiment of the invention, the umbrella rod may have a rib, and the screw rod bearing seat may have a recess fit for the rib.

Because the recess fits the rib, the screw rod bearing seat can be positioned.

In one embodiment of the invention, the electric mechanism may further include a coupling, and the screw rod connector and the motor may be connected via the coupling. The cranking mechanism may further include spacers disposed at both sides of the positioning convex edge.

In one embodiment of the invention, the opening and closing structure for the umbrella combining automatic and non-automatic modes may further include a tubular umbrella rod. The cranking mechanism may further include a cranking handle shell mounted on the umbrella rod. The first transmission element may be a turbine and the second transmission element may be a worm, and the second transmission element may be rotatably mounted in the cranking handle shell. The clutch structure may include a drive shaft, an elastic reset element, and a control element. The drive shaft may be rotatably mounted in the cranking handle shell and capable of sliding along an axial direction of the drive shaft. An axis of the drive shaft may coincide with the axis of the second transmission element. One end of the drive shaft may be clutchably connected with the second transmission element, and the other end of the drive shaft may be connected with the cranking handle and driven by the cranking handle to rotate. The elastic reset element may be capable of driving the drive shaft to slide away from the second transmission element in cooperation with the drive shaft, so as to maintain the drive shaft and the second transmission element in a dissociated state. The control element may be configured to control the drive shaft to slide toward the second transmission element so as to maintain the drive shaft and the second transmission element in an associated state.

In one embodiment of the invention, the control element may include a sliding element and a button. The sliding element may be slidably mounted in the cranking handle shell. The sliding element may be located outside the umbrella rod, and a sliding direction of the sliding element may remain the same as a longitudinal direction of the drive shaft. The sliding element may have a first drive surface disposed obliquely relative to the sliding direction of the sliding element. The button may be slidably mounted at the cranking handle shell. The button may have a second drive surface slidably abutted against the first drive surface. When provided with force, the button may be configured to drive the sliding element to slide, and when driven by the button, the sliding element may cooperate with the drive shaft to drive the drive shaft to slide toward the second transmission element.

In one embodiment of the invention, the sliding element may include a first sliding block and a second sliding block. The first sliding block and the second sliding block may be enclosed as an annular shape. The first drive surface may be located on the first sliding block. One side far away from the second transmission element of the drive shaft may be abutted against an inside wall of the second sliding block. The cranking handle may have a rotating axis, and the rotating axis of the cranking handle may pass through the second sliding block, and then may be connected with the drive shaft. A side wall of the cranking handle shell may have a through-hole. The button may include a pressed part and a disengagement prevention part, the pressed part may be movably disposed in the through-hole, the disengagement prevention part may be connected to the pressed part, and the second drive surface may be located on the disengagement prevention part.

In one embodiment of the invention, the screw rod may be located in the umbrella rod and disposed along a longitudinal direction of the umbrella rod. The electric mechanism may further include a screw rod bearing seat, a screw rod connector, and a first bearing. The screw rod bearing seat and the screw rod connector may be disposed between the screw rod and the motor. An upper end of the screw rod connector may be fixedly connected with the screw rod, and a lower end of the screw rod connector may be connected with the motor. The screw rod connector may be rotatably mounted at the screw rod bearing seat via the first bearing. The cranking mechanism may further include a first bearing seat and a second bearing seat. The first bearing seat and the second bearing seat may be disposed in the cranking handle shell. The drive shaft may be interspersed in the first bearing seat and the second bearing seat. One end of the second transmission element may stretch into the first bearing seat. A side wall of the drive shaft may have a positioning convex edge, and the second sliding block may be abutted against the positioning convex edge. The elastic reset element may be a reset spring. One end of the elastic reset element may be abutted against the positioning convex edge of the drive shaft, and the other end of the elastic reset element may be abutted against the second bearing seat.

In one embodiment of the invention, the umbrella rod may have a rib, and the screw rod bearing seat may have a recess fit for the rib.

In one embodiment of the invention, the electric mechanism may further include a coupling, and the screw rod connector and the motor are connected via the coupling. The cranking mechanism may further include spacers disposed at both sides of the positioning convex edge.

The invention also provide another opening and closing structure for an umbrella combining automatic and non-automatic modes, including an electric mechanism, a cranking mechanism, and a clutch structure. The electric mechanism and the cranking mechanism are configured to open and close the umbrella, respectively. The electric mechanism includes a screw rod, a motor, and a first transmission element. The motor is configured to drive rotation of the screw rod. The first transmission element is disposed at the screw rod. The cranking mechanism includes a second transmission element and a cranking handle. The cranking handle is configured to drive rotation of the second transmission element, and the second transmission element is engaged with the first transmission element via the clutch structure.

In case of the umbrella is under normal power supply, the clutch structure is in a dissociated state, so that the umbrella is opened and closed via the electric mechanism, that is, the motor drives the screw rod to rotate, and then the screw rod drives an umbrella's plate or an inner tube to rise and fall so as to realize opening and closing of the umbrella. In case of no external power supply or shortage of battery charging, the motor cannot start, and the clutch structure is adjusted to the associated state, in this case, the first transmission element and the second transmission element are engaged, which makes the cranking handle drive the first transmission element to rotate so as to realize the opening and closing operations of the umbrella. The umbrella can be opened and closed automatically or manually, and meanwhile the two operating modes can be switched via the clutch structure, without interfering with each other.

In one embodiment of the invention, the opening and closing structure for the umbrella combining automatic and non-automatic modes may further include a tubular umbrella rod. The cranking mechanism may further include a cranking handle shell mounted on the umbrella rod. The first transmission element and the second transmission element may be both tapered gears. The second transmission element may be rotatably mounted in the cranking handle shell. The clutch structure may include a drive shaft, an elastic reset element, and a control element. The drive shaft may be rotatably mounted in the cranking handle shell and capable of sliding along an axial direction of the drive shaft. An axis of the drive shaft may coincide with an axis of the second transmission element. One end of the drive shaft may be fixedly connected with the second transmission element, the second transmission element may be clutchably cooperated with the first transmission element, and the other end of the drive shaft may be connected with the cranking handle and driven by the cranking handle to rotate. The elastic reset element may be capable of driving the drive shaft to slide away from the first transmission element in cooperation with the drive shaft, so as to maintain the second transmission element and the first transmission element in a dissociated state. The control element is configured to control the drive shaft to slide toward the first transmission element so as to maintain the second transmission element and the first transmission element in an associated state.

The first transmission element and the drive shaft are fixed; by operating the control element, the drive shaft and the first transmission element can be driven to slide toward the second transmission element, and thus making the second transmission element engage with the second transmission element, in this case, the second transmission element can be driven by the cranking handle to rotate, so that an electric mode of opening the umbrella is switched to a manual mode. When the control element is not subjected to an external force, the drive shaft will drive the second transmission element and the first transmission element to separate under arm action of the elastic reset element, so that the manual mode of opening the umbrella is switched to the electric mode. There are many clutching connection forms between the drive shaft and the transmission element, such as an inserting fit, engagement, interference fit and matching up with a resistance plate, etc. The control element also has various structures, such as a press rod slidably disposed at the cranking handle shell and abutted against the drive shaft, or a press piece connected with a side wall of the drive shaft, which are all feasible as long as they can overcome an elasticity of the elastic reset element to drive the drive shaft to slide toward the second transmission element.

In one embodiment of the invention, the control element may include a sliding element and a button. The sliding element may be slidably mounted in the cranking handle shell, and a sliding direction of the sliding element may remain the same as a longitudinal direction of the drive shaft. The sliding element may have a first drive surface disposed obliquely relative to the sliding direction of the sliding element. The button may be slidably mounted at the cranking handle shell, and the button may have a second drive surface slidably abutted against the first drive surface. When provided with force, the button may be configured to drive the sliding element to slide, and when driven by the button, the sliding element may cooperate with the drive shaft to drive the drive shaft to slide toward the second transmission element.

In one embodiment of the invention, the sliding element may include a first sliding block and a second sliding block. The first sliding block and the second sliding block may be enclosed as an annular shape. The sliding element may be sleeved on the umbrella rod. The first drive surface may be located on the first sliding block. One side far away from the second transmission element of the drive shaft may be abutted against an inside wall of the second sliding block. The cranking handle may have a rotating axis, and the rotating axis may pass through the second sliding block and then be connected with the drive shaft. A side wall of the cranking handle shell may have a through-hole. The button may include a pressed part and a disengagement prevention part. The pressed part may be movably disposed in the through-hole, the disengagement prevention part may be connected to the pressed part, and the second drive surface may be located on the disengagement prevention part.

In one embodiment of the invention, the screw rod may be located in the umbrella rod and disposed along a longitudinal direction of the umbrella rod. The electric mechanism may further include a screw rod bearing seat, a screw rod connector, and a first bearing. The screw rod bearing seat and the screw rod connector may be disposed between the screw rod and the motor. An upper end of the screw rod connector may be fixedly connected with the screw rod, and a lower end of the screw rod connector may be connected with the motor. The screw rod connector may be rotatably mounted at the screw rod bearing seat via the first bearing. The cranking mechanism may further include a first bearing seat and a second bearing seat, The first bearing seat and the second bearing seat may be successively fixedly connected to a side wall of the screw rod bearing seat. The second bearing seat may be sleeved on the first bearing seat, and the drive shaft may be interspersed in the first bearing seat and the second bearing seat. A side wall of the drive shaft may have a positioning convex edge, and the second sliding block may be abutted against the positioning convex edge. The elastic reset element may be a reset spring. The elastic reset element may be sleeved on the first bearing seat and located in the second bearing seat. One end of the elastic reset element may be abutted against the positioning convex edge of the drive shaft, and the other end of the elastic reset element is abutted against the second bearing seat.

In one embodiment of the invention, the umbrella rod may have a rib, and the screw rod bearing seat may have a recess fit for the rib.

In one embodiment of the invention, the electric mechanism may further include a coupling, and the screw rod connector and the motor are connected via the coupling. The cranking mechanism may further include spacers disposed at both sides of the positioning convex edge.

Each embodiment of the invention is based on a general invention concept where automatic and non-automatic switching can be achieved by means of a clutch structure. In case of power supply, the clutch structure is in a dissociated state, so that the first transmission part and the cranking handle will not be connected to move, in this case, the motor drives the screw rod to rotate. In case of no power supply, the clutching mechanism is in an associated state, so that the first transmission element and the cranking handle are connected to move, and thus making the cranking handle drive the first transmission element to rotate.

In this invention, the disengagement prevention part has two functions. One is to prevent the button from being disengaged from the cranking handle shell, and the other is to provide a second drive surface which is matched with the first drive surface. In actual use, the disengagement prevention part includes a disengagement prevention element located in the cranking handle shell and a structure connected with the pressed part and stretching into the cranking handle shell. The disengagement prevention element is fixed onto the structure connected with the pressed part and stretching into the cranking handle shell via a fastener, such as a screw. "The second drive surface is located on the disengagement prevention part" means that the second drive surface can either be disposed on the structure connected with the pressed part and stretching into the cranking handle shell or on the disengagement prevention element.

The beneficial effects of the present invention are as below. The invention overturns a conventional method of using an electric umbrella, and provides a manual lifting-and-lowering function under the premise of maintaining a electric lifting-and-lowering function, that is, in case of insufficient or no power supply, the umbrella can be opened and closed through the cranking handle.

Figure 1:
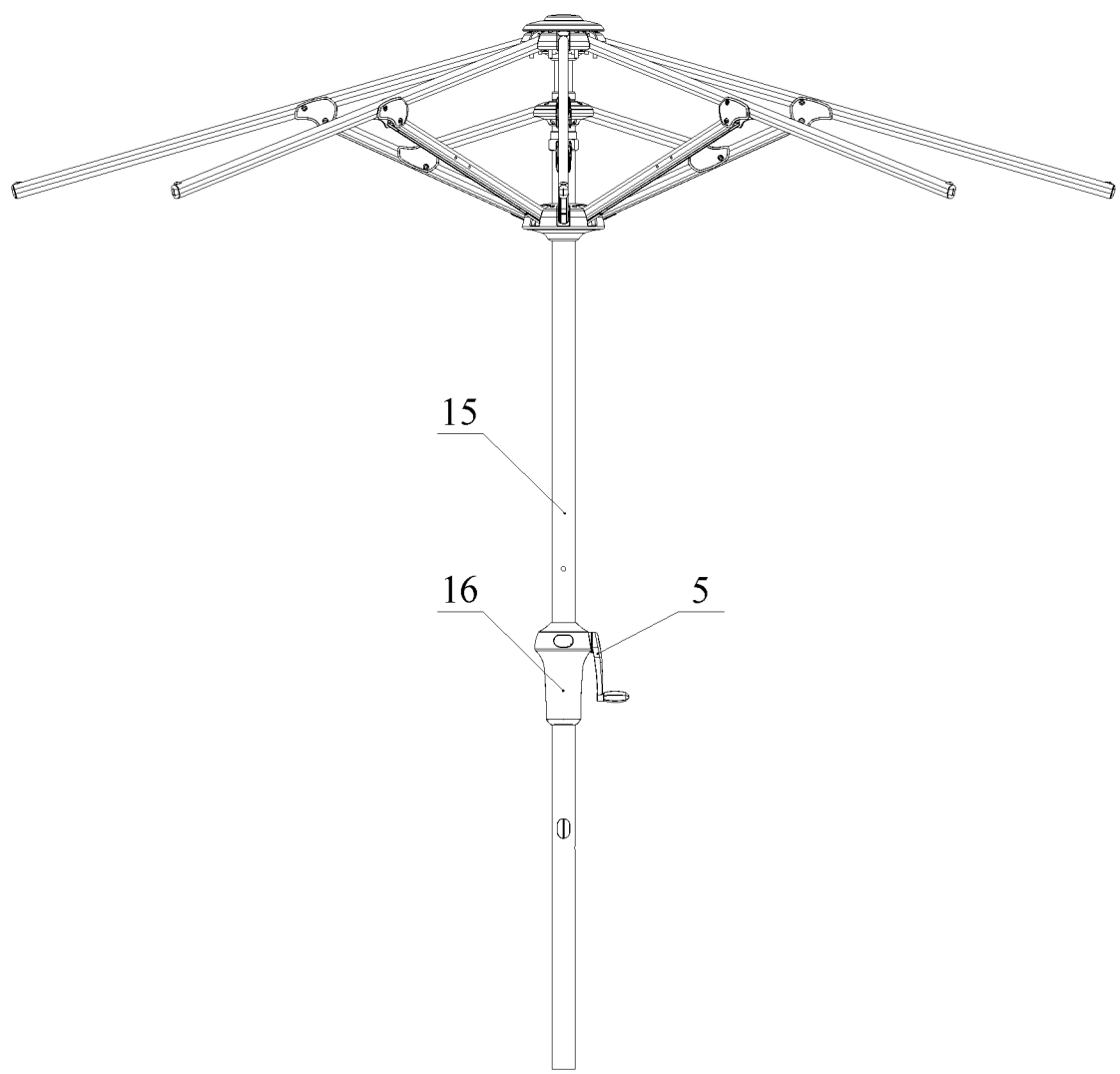
FIG. 1 is a use-state structure diagram of an opening and closing structure for an umbrella combining automatic and non-automatic modes according Embodiment 1 of the invention.

Elements in the drawings are marked as below:
1. screw rod; 2. motor; 3. first transmission element; 4. second transmission element; 5. cranking handle; 6. sliding element; 61. first sliding block; 62. second sliding block; 63. first drive surface; 7. elastic reset element; 8. button; 81. second drive surface; 82. disengagement prevention part; 83. pressed part; 9. drive shaft; 91. positioning convex edge; 10. second bearing; 11. screw rod connector; 12. screw rod bearing seat; 13. tapered-gear bearing seat; 14. first bearing; 15. umbrella rod; 16. cranking handle shell; 17. first bearing seat; 18. second bearing seat; 19. coupling; 20. recess; 21. through-hole; 24. rib; 25. spacer; 30. control element; 51. rotating axis; 100. electric mechanism; 200. cranking mechanism; 300. clutch structure.

DETAILED DESCRIPTION OF THE INVENTION

The present invention is further detailed in combination with the drawings as below.

Embodiment 1

As shown in FIGS. 1-5, an opening and closing structure for an umbrella combining automatic and non-automatic modes includes an electric mechanism 100, a cranking mechanism 200, and a clutch structure 300. The electric mechanism 100 and the cranking mechanism 200 are configured to open and close the umbrella, respectively. The electric mechanism 100 includes a screw rod 1, a motor 2, and a first transmission element 3. The motor 2 is configured to drive rotation of the screw rod 1. The first transmission element 3 is mounted at the screw rod 1. The cranking mechanism 200 includes a second transmission element 4 and a cranking handle 5. The second transmission element 4 is engaged with the first transmission element 3, and the second transmission element 4 is connected with the cranking handle 5 via the clutch structure 300.

In this embodiment, the opening and closing structure for the umbrella further includes a tubular umbrella rod 15. The cranking mechanism 200 further includes a cranking handle shell 16 mounted on the umbrella rod 15. the first transmission element 3 and the second transmission element 4 are both tapered gears, and the second transmission element 4 is rotatably mounted in the cranking handle shell 16.

The clutch structure 300 includes a drive shaft 9, a elastic reset element 7, and a control element 40. The drive shaft 9 is rotatably mounted in the cranking handle shell 16 and capable of sliding along an axial direction of the drive shaft. An axis of the drive shaft 9 coincides with an axis of the second transmission element 4. One end of the drive shaft 9 is clutchably connected with the second transmission element 4, and the other end of the drive shaft 9 is connected with the cranking handle 5 and driven by the cranking handle 5 to rotate.

The elastic reset element 7 is capable of driving the drive shaft 9 to slide away from the second transmission element 4 in cooperation with the drive shaft 9, so as to maintain the drive shaft 9 and the second transmission element 4 in a dissociated state.

The control element 40 is configured to control the drive shaft 9 to slide toward the second transmission element 4 so as to maintain the drive shaft 9 and the second transmission element 4 in an associated state.

As shown in FIGS. 2-5, in this embodiment, the control element 40 includes a sliding element 6 and a button 8. The sliding element 6 is slidably mounted in the cranking handle shell 16, and a sliding direction of the sliding element 6 remains the same as a longitudinal direction of the drive shaft 9. The sliding element 6 has a first drive surface 63 disposed obliquely relative to the sliding direction of the sliding element 6. The button 8 is slidably mounted at the cranking handle shell 16, and the button 8 has a second drive surface 81 slidably abutted against the first drive surface 63. When provided with force, the button 8 is configured to drive the sliding element 6 to slide, and when driven by the button 8, the sliding element 6 cooperates with the drive shaft 9 to drive the drive shaft 9 to slide toward the second transmission element 4.

As shown in FIGS. 2-5, in this embodiment, the sliding element 6 includes a first sliding block 61 and a second sliding block 62. The first sliding block 61 and the second sliding block 62 are enclosed as an annular shape. The sliding element 6 is sleeved on the umbrella rod 15, and the first drive surface 63 is located on the first sliding block 61. One side far away from the second transmission element 4 of the drive shaft 9 is abutted against an inside wall of the second sliding block 62. The cranking handle 5 has a rotating axis 51, and the rotating axis 51 passes through the second sliding block 62 and then is connected with the drive shaft 9. A side wall of the cranking handle shell 16 has a through-hole 21. The button 8 includes a pressed part 83 and a disengagement prevention part 82. The pressed part 83 is movably disposed in the through-hole 21, the disengagement prevention part 82 is connected to the pressed part 83. The second drive surface 81 is located on the disengagement prevention part 82.

Figure 2:
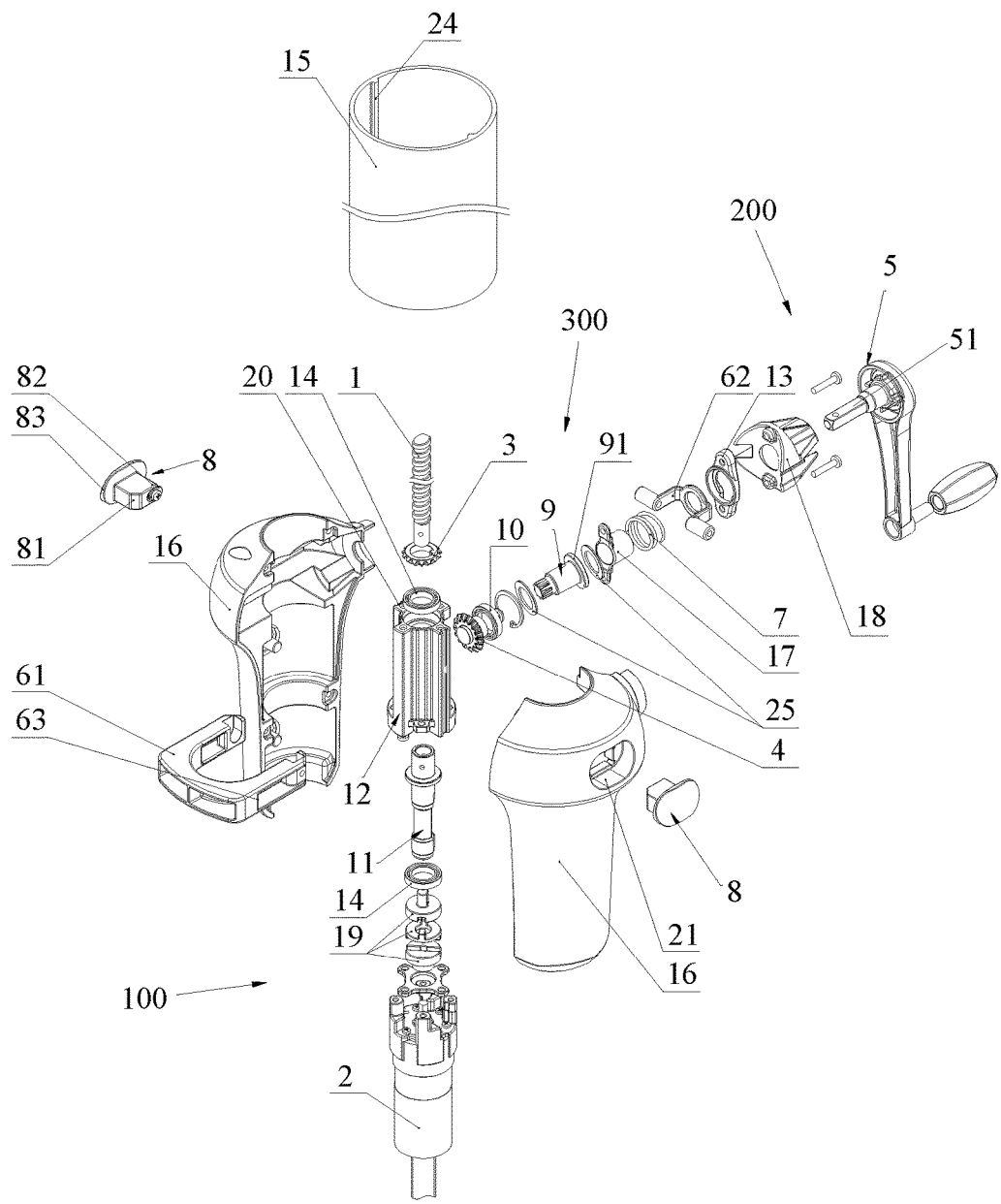
FIG. 2 is an explosive diagram of the opening and closing structure for the umbrella combining automatic and non-automatic modes according Embodiment 1 of the invention.
Figure 3:
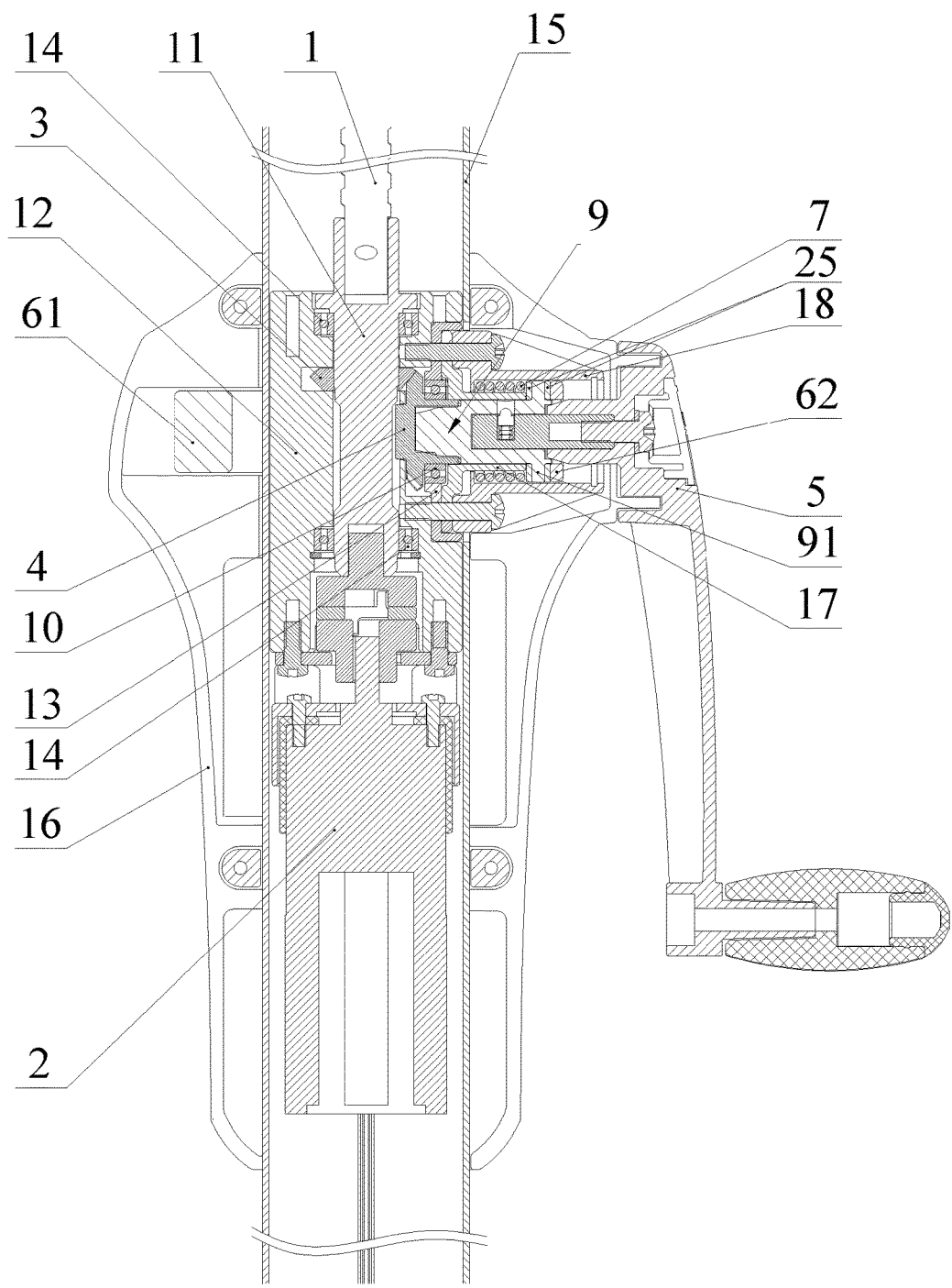
FIG. 3 is a longitudinal section view of a clutch structure of the opening and closing structure for the umbrella combining automatic and non-automatic modes in an associated state according Embodiment 1 of the invention.

As shown in FIG. 2 and FIG. 3, in this embodiment, the screw rod 1 is located in the umbrella rod 15 and disposed along a longitudinal direction of the umbrella rod 15. The electric mechanism 100 further includes a screw rod bearing seat 12, a screw rod connector 11, and a first bearing 1. The screw rod bearing seat 12 and the connector 11 are disposed between the screw rod 1 and the motor 2. An upper end of the screw rod connector 11 is fixedly connected with the screw rod 1, and a lower end of the screw rod connector 11 is connected with the motor 2. The screw rod connector 11 is rotatably mounted at the screw rod bearing seat 12 via a first bearing 14.

The cranking mechanism 200 further includes a tapered-gear bearing seat 13, a first bearing seat 17, a second bearing seat 18, and a second bearing 10. The tapered-gear bearing seat 13, the first bearing seat 17, and the second bearing seat 18 are successively fixedly connected to a side wall of the screw rod bearing seat 12. The second bearing 10 is sleeved on the second transmission element 4, and mounted in the tapered-gear bearing seat 13. The second bearing seat 18 is sleeved on the first bearing seat 17. The drive shaft 9 is interspersed in the first bearing seat 17 and the second bearing seat 18. A side wall of the drive shaft 9 has a positioning convex edge 91, and the second sliding block 62 is abutted against the positioning convex edge 91. The elastic reset element 7 is a reset spring. The elastic reset element 7 is sleeved on the first bearing seat 17 and located in the second bearing seat 18. One end of the elastic reset element 7 is abutted against the positioning convex edge 91, and the other end of the elastic reset element 7 is abutted against the second bearing seat 18.

Figure 4:
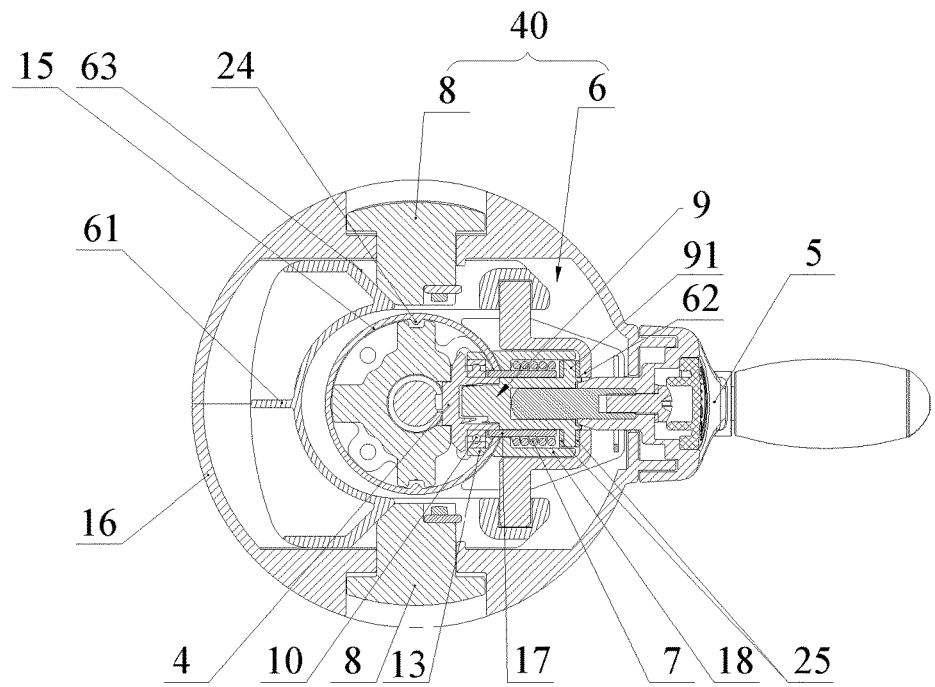
FIG. 4 is a cross-section view of the clutch structure of the opening and closing structure for the umbrella combining automatic and non-automatic modes in an associated state according Embodiment 1 of the invention.

As shown in FIGS. 2-4, in this embodiment, the umbrella rod 15 has a rib 24, and the screw rod bearing seat 12 has a recess 20 fit for the rib 24.

As shown in FIG. 2, in this embodiment, the electric mechanism 100 further includes a coupling 19, and the screw rod connector 11 and the motor 2 are connected via the coupling 19. The cranking mechanism 200 further includes spacers (25) disposed at both sides of the positioning convex edge 91.

Figure 5:
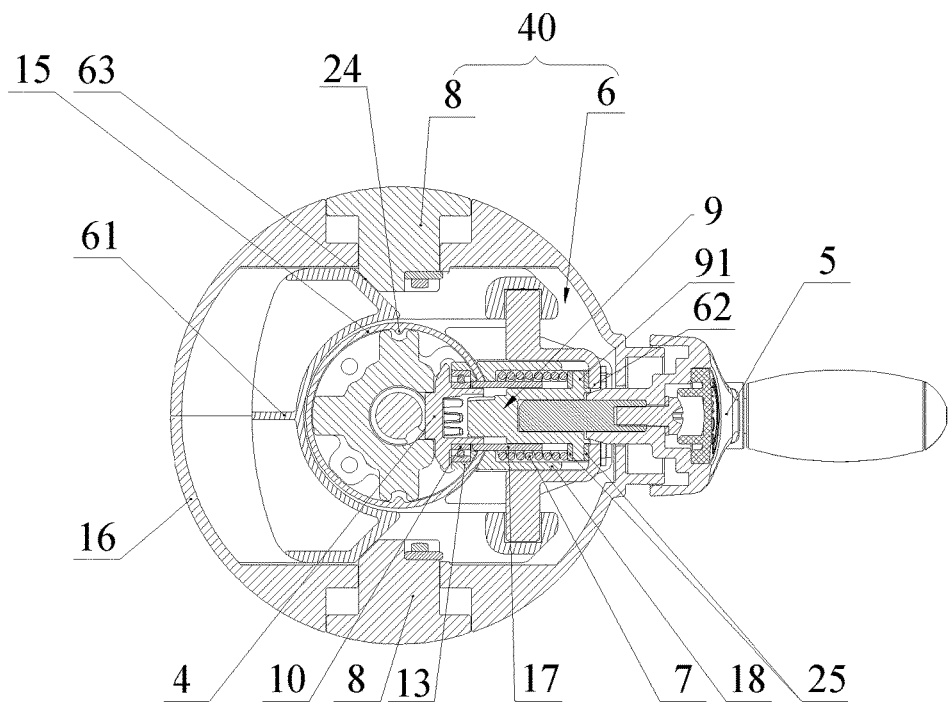
FIG. 5 is a cross-section view of the clutch structure of the opening and closing structure for the umbrella combining automatic and non-automatic modes in a dissociated state according Embodiment 1 of the invention.

The working principle of the opening and closing structure for the umbrella in this embodiment is as below. As shown in FIG. 4, when the button 8 is pressed to move into the cranking handle shell 16, the second drive surface 81 of the button 8 contacts the first drive surface 63 of the first sliding block 61 so as to push the first sliding block 61 to move in a direction away from the cranking handle 5. The first sliding block 61 and the second sliding block 62 are connected to drive the second sliding block 62 to move together with the first sliding block 61, and meanwhile the second sliding block 62 drives the drive shaft 9 to compress the elastic reset element 7. The drive shaft 9 and the second transmission element 4 can be connected to move via gear engagement or interference fit. The rotating axis 51 of the cranking handle 5 and the drive shaft 9 are connected and the cranking handle 5 is also pressed to move into the cranking handle shell 16, so that the cranking handle 5 is rotated to drive the drive shaft 9 to rotate and also drive the second transmission element 4 to rotate, and then the second transmission element 4 drives the first transmission element 3 to rotate so as to realize a manual opening of the umbrella. As shown in FIG. 5, when the button 8 is released, that is, without pressing the button 8, the elastic reset element 7 returns to an original state by its elastic force, and the drive shaft 9 and the second transmission element 4 are separated. The disengagement prevention part 82 of the button 8 can prevent the button 8 from being disengaged from the through-hole 21, in this case, rotating the cranking handle 5 cannot drive the screw rod 1 to rotate, so that the screw rod 1 can realize an automatic opening and closing of the umbrella, driven by the motor 2. In this embodiment, the two lifting-and-lowering modes can be enabled via the clutch structure 300 without interrupting each other.

In this embodiment, the screw rod 1 is configured to connected an umbrella's inner tube, a top of the inner tube can be connected with an upper plate of the umbrella. When the screw rod 1 rotates, the inner tube is lifted and lowered, and drives the upper plate of the umbrella to rise and fall, so as to realize opening and closing of the umbrella. The screw rod 1 is also configured to connect a lower plate of the umbrella. When the lower plate of the umbrella is lifted and lowered with rotation of the screw rod 1, the umbrella can be opened and closed.

Embodiment 2

As shown in FIGS. 6-10, an opening and closing structure for an umbrella combining automatic and non-automatic modes includes an electric mechanism 100, a cranking mechanism 200, and a clutch structure 300. The electric mechanism 100 and the cranking mechanism 200 are configured to open and close the umbrella, respectively. The electric mechanism 100 includes a screw rod 1, a motor 2, and a first transmission element 3. The motor 2 is configured to drive rotation of the screw rod 1. The first transmission element 3 is mounted at the screw rod 1. The cranking mechanism 200 includes a second transmission element 4 and a cranking handle 5. The second transmission element 4 is engaged with the first transmission element 3, and the second transmission element 4 is connected with the cranking handle 5 via the clutch structure 300.

As shown in FIGS. 7-10, in this embodiment, the opening and closing structure for the umbrella further includes a tubular umbrella rod 15. The cranking mechanism 200 further includes a cranking handle shell 16 mounted on the umbrella rod 15. The first transmission element 3 is a turbine, and the second transmission element 4 is a worm. The second transmission element 4 is rotatably mounted in the cranking handle shell 16.

The clutch structure 300 includes a drive shaft 9, an elastic reset element 7, and a control element 40. The drive shaft 9 is rotatably mounted in the cranking handle shell 16 and capable of sliding along an axial direction of the drive shaft. An axis of the drive shaft 9 coincides with an axis of the second transmission element 4. One end of the drive shaft 9 is clutchably connected with the second transmission element 4, and the other end is connected with the cranking handle 5 and driven by the cranking handle 5 to rotate.

The elastic reset element 7 is capable of driving the drive shaft 9 to slide away from the second transmission element 4 in cooperation with the drive shaft 9, so as to maintain the drive shaft 9 and the second transmission element 4 in a dissociated state.

The control element 40 is configured to control the drive shaft 9 to slide toward the second transmission element 4 so as to maintain the drive shaft 9 and the second transmission element 4 in an associated state.

As shown in FIGS. 7-10, in this embodiment, the control element 40 includes a sliding element 6 and a button 8. The sliding element 6 is slidably mounted in the cranking handle shell 16. The sliding element 6 is located outside the umbrella rod 15. A sliding direction of the sliding element 6 remains the same as a longitudinal direction of the drive shaft 9. The sliding element 6 has a first drive surface 63 disposed obliquely relative to the sliding direction of the sliding element 6. The button 8 is slidably mounted at the cranking handle shell 16, and the button 8 has a second drive surface 81 slidably abutted against the first drive surface 63. When provided with force, the button 8 is configured to drive the sliding element 6 to slide, and when driven by the button 8, the sliding element 6 cooperates with the drive shaft 9 to drive the drive shaft 9 to slide toward the second transmission element 4.

As shown in FIGS. 7-10, in this embodiment, the sliding element 6 includes a first sliding block 61 and a second sliding block 62. The first sliding block 61 and the second sliding block are enclosed as an annular shape. The first drive surface 63 is located on the first sliding block 61. One side far away from the second transmission element 4 of the drive shaft 9 is abutted against an inside wall of the second sliding block 62. A rotating axis 51 of the cranking handle 5 passes through the second sliding block 62, and then is connected with the drive shaft 9. A side wall of the cranking handle shell 16 has a through-hole 21. The button 8 includes a pressed part 83 and a disengagement prevention part 82, the pressed part 83 is movably disposed in the through-hole 21, the disengagement prevention part 82 is connected to the pressed part 83, and the second drive surface 81 is located on the disengagement prevention part 82.

Figure 6:
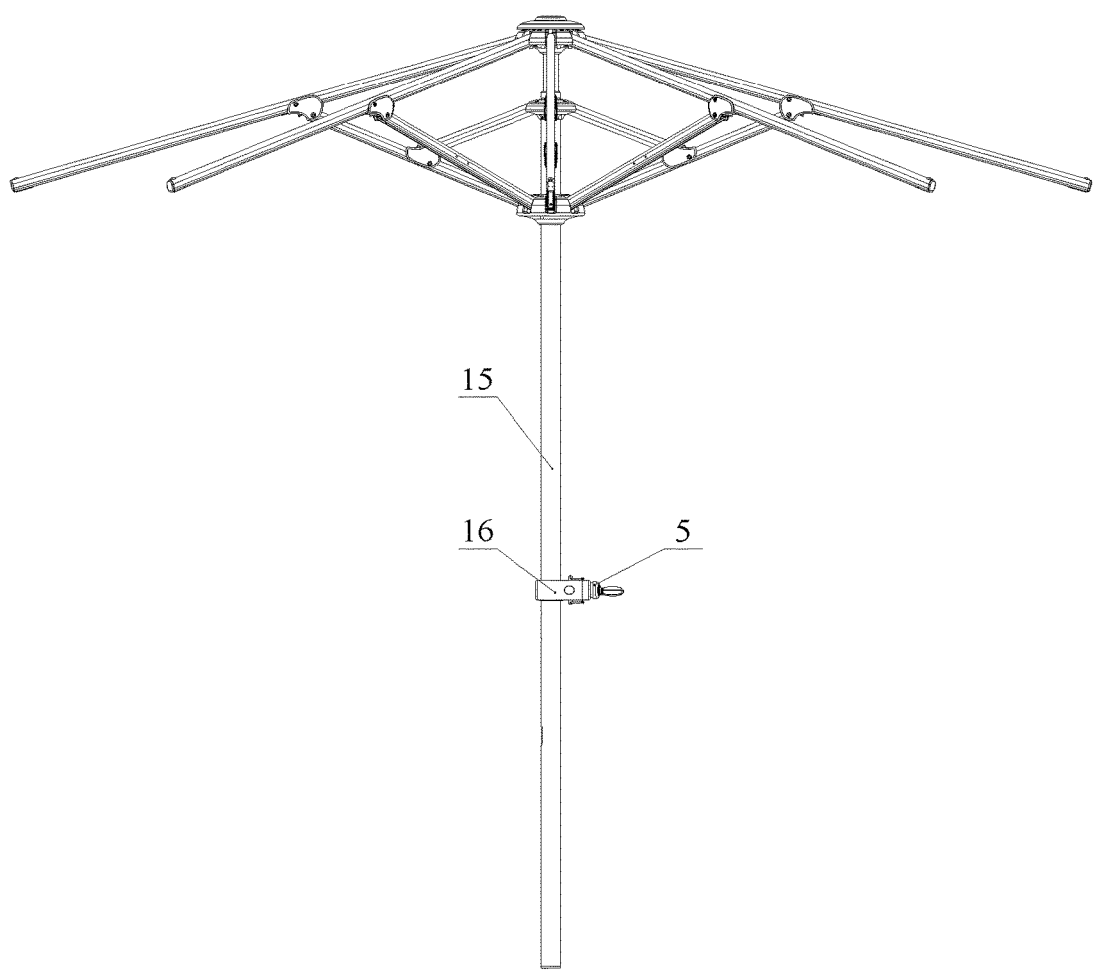
FIG. 6 is a use-state structure diagram of an opening and closing structure for an umbrella combining automatic and non-automatic modes according Embodiment 2 of the invention.
Figure 7:
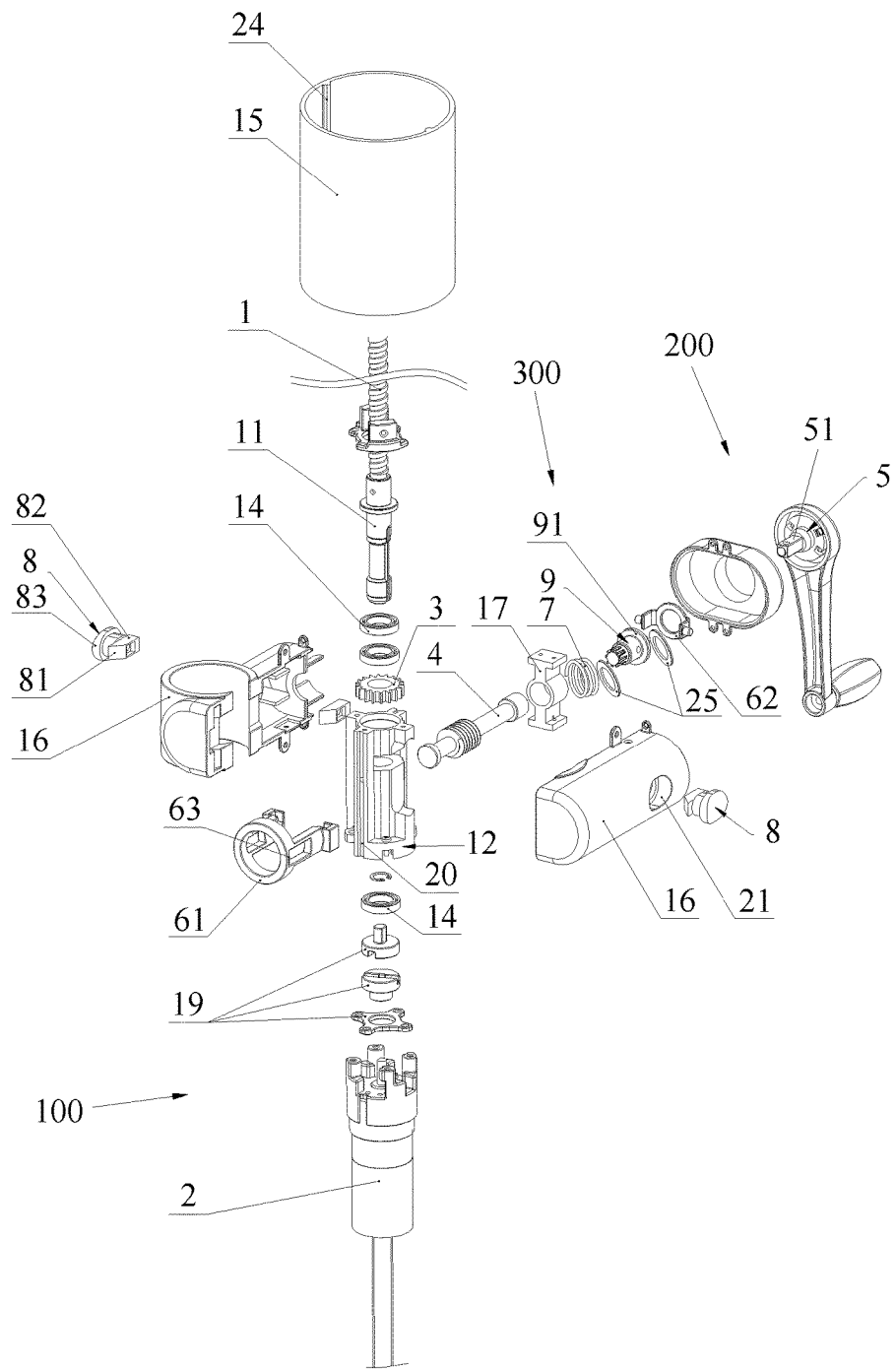
FIG. 7 is an explosive diagram of the opening and closing structure for the umbrella combining automatic and non-automatic modes according Embodiment 2 of the invention.
Figure 9:
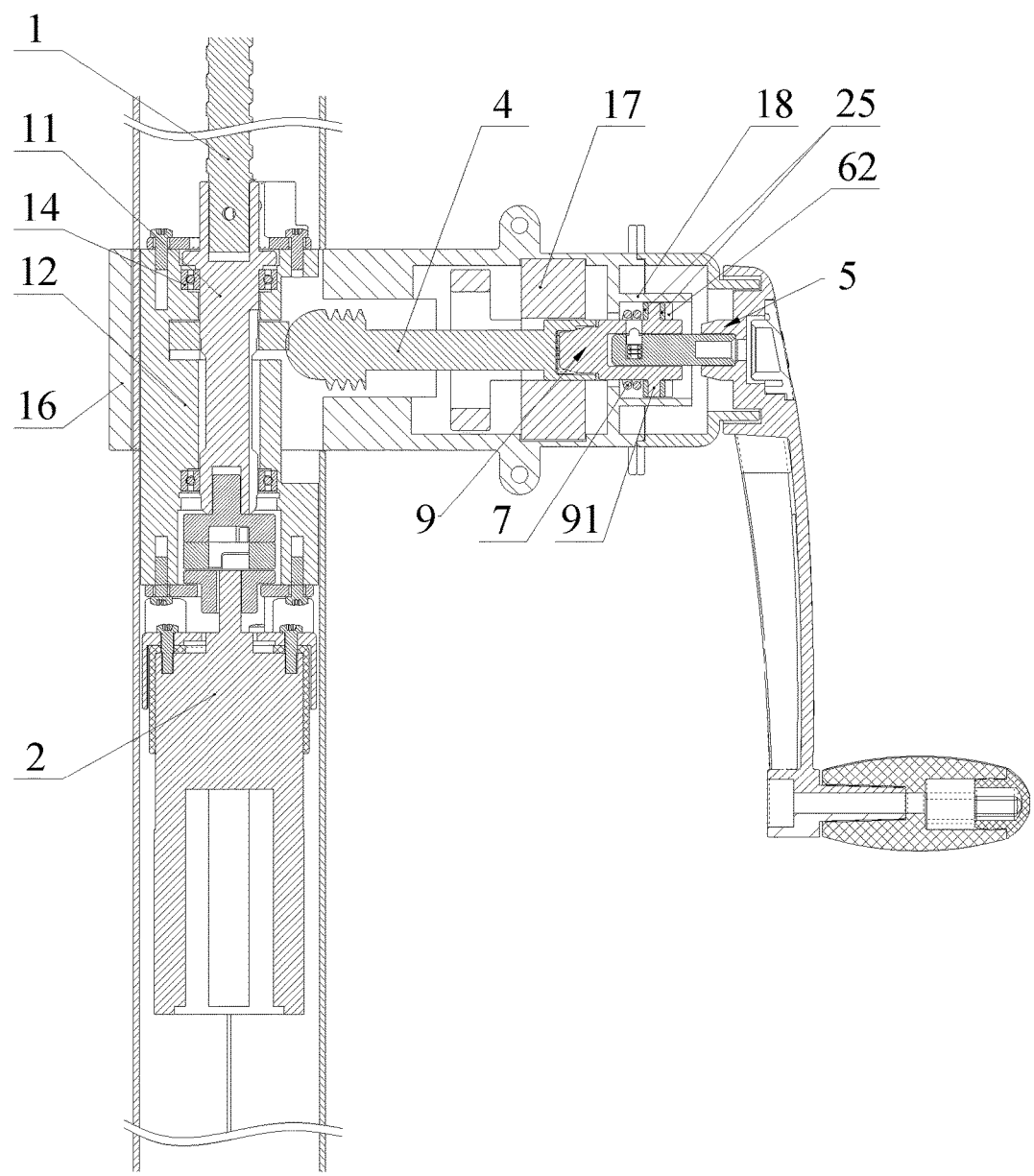
FIG. 9 is an A-A stepped section view of FIG. 8.

As shown in FIG. 6 and FIG. 9, in this embodiment, the screw rod 1 is located in the umbrella rod 15 and disposed along a longitudinal direction of the umbrella rod 15. The electric mechanism 100 further includes a screw rod bearing seat 12, a screw rod connector 11, and a first bearing 14, the screw rod bearing seat 12 and the screw rod connector 11 are disposed between the screw rod 1 and the motor 2. An upper end of the screw rod connector 11 is fixedly connected with the screw rod 1, and a lower end of the screw rod connector 11 is connected with the motor 2. The screw rod connector 11 is rotatably mounted at the screw rod bearing seat 12 via the first bearing 14.

The cranking mechanism 200 further includes a first bearing seat 17 and a second bearing seat 18. the first bearing seat 17 and the second bearing seat 18 are disposed in the cranking handle shell 16. The drive shaft 9 is interspersed in the first bearing seat 17 and the second bearing seat 18, and one end of the second transmission element 4 stretches into the first bearing seat 17. A side wall of the drive shaft 9 has a positioning convex edge 91, and the second sliding block 62 is abutted against the positioning convex edge 91. The elastic reset element 7 is a reset spring. One end of the element 7 is abutted against the positioning convex edge 91 of the drive shaft 9, and the other end of the element 7 is abutted against the second bearing seat 18.

As shown in FIG. 6, in this embodiment, the umbrella rod 15 has a rib 24, and the screw rod bearing seat 12 has a recess 20 fit for the rib 24.

In this embodiment, the electric mechanism 100 further includes a coupling 19, the screw rod connector 11 and the motor 2 are connected via the coupling 19, and the cranking mechanism 200 further includes spacers 25 disposed at both sides of the positioning convex edge 91.

Figure 8:
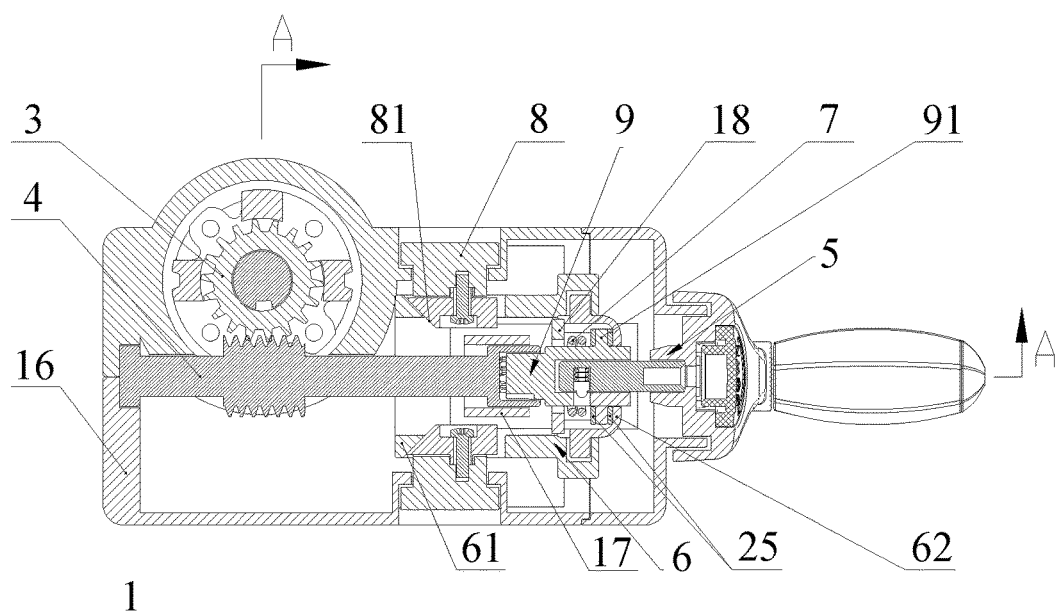
FIG. 8 is a cross-section view of the clutch structure of the opening and closing structure for the umbrella combining automatic and non-automatic modes in an associated state according Embodiment 2 of the invention.
Figure 10:
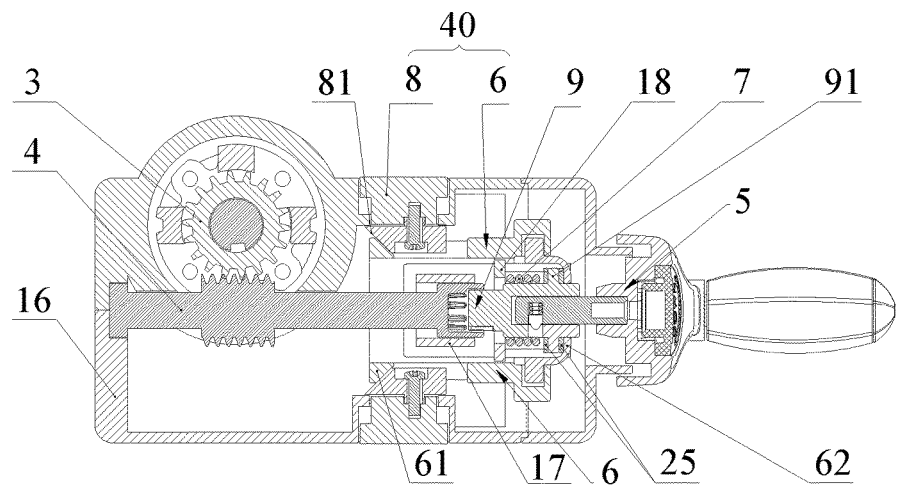
FIG. 10 is a cross-section view of the clutch structure of the opening and closing structure for the umbrella combining automatic and non-automatic modes in a dissociated state according Embodiment 2 of the invention.
Figure 11:
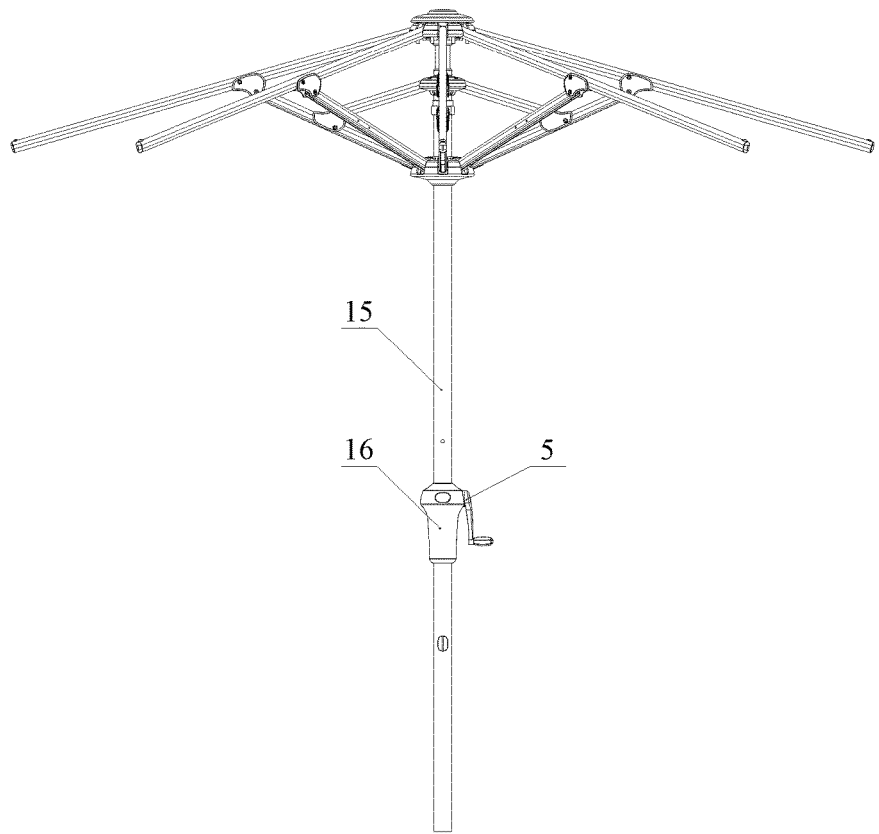
FIG. 11 is a use-state structure diagram of an opening and closing structure for an umbrella combining automatic and non-automatic modes according Embodiment 3 of the invention.

The working principle in this embodiment is identical to Embodiment 1. As shown in FIG. 8, when the button 8 is pressed to move into the cranking handle shell 16, the second drive surface 81 of the button 8 contacts the first drive surface 63 of the first sliding block 61 so as to push the first sliding block 61 to move in a direction away from the cranking handle 5. The first sliding block 61 and the second sliding block 62 are connected to drive the second sliding block 62 to move together with the first sliding block 61, and meanwhile the second sliding block 62 drives the drive shaft 9 to compress the elastic reset element 7. The drive shaft 9 and the second transmission element 4 can be connected to move via gear engagement or interference fit. The rotating axis 51 of the cranking handle 5 and the drive shaft 9 are connected and the cranking handle 5 is also pressed to move into the cranking handle shell 16, so that the cranking handle 5 is rotated to drive the drive shaft 9 to rotate and also drive the second transmission element 4 to rotate, and then the second transmission element 4 drives the first transmission element 3 to rotate so as to realize a manual opening of the umbrella. As shown in FIG. 10, when the button 8 is released, that is, without pressing the button 8, the elastic reset element 7 returns to an original state by its elastic force, and the drive shaft 9 and the second transmission element 4 are separated. The disengagement prevention part 82 of the button 8 can prevent the button 8 from being disengaged from the through-hole 21, in this case, rotating the cranking handle 5 cannot drive the screw rod 1 to rotate, so that the screw rod 1 can realize an automatic opening and closing of the umbrella, driven by the motor 2. In this embodiment, the two lifting-and-lowering modes can be enabled via the clutch structure 300 without interrupting each other.

In this embodiment, the screw rod 1 is configured to connected an umbrella's inner tube, a top of the inner tube can be connected with an upper plate of the umbrella. When the screw rod 1 rotates, the inner tube is lifted and lowered, and drives the upper plate of the umbrella to rise and fall, so as to realize opening and closing of the umbrella. The screw rod 1 is also configured to connect a lower plate of the umbrella. When the lower plate of the umbrella is lifted and lowered with rotation of the screw rod 1, the umbrella can be opened and closed.

Embodiment 3

As shown in FIGS. 11-15, an opening and closing structure for an umbrella combining automatic and non-automatic modes, includes an electric mechanism 100, a cranking mechanism 200, and a clutch structure 300. The electric mechanism 100 and the cranking mechanism 200 are configured to open and close the umbrella, respectively. The electric mechanism 100 includes a screw rod 1, a motor 2 and a first transmission element 3. The motor 2 is configured to drive rotation of the screw rod 1. The first transmission element 3 is disposed at the screw rod 1. The cranking mechanism 200 includes a second transmission element 4 and a cranking handle 5. The cranking handle 5 is configured to drive rotation of the second transmission element. The second transmission element 4 is engaged with the first transmission element 3 via the clutch structure 300.

As shown in FIGS. 12-15, in this embodiment, the opening and closing structure for the umbrella includes a tubular umbrella rod 15. The cranking mechanism 200 further includes a cranking handle shell 16 mounted on the umbrella rod 15. The first transmission element 3 are both tapered gears, The second transmission element 4 is rotatably mounted in the cranking handle shell 16.

The clutch structure 300 includes a drive shaft 9, an elastic reset element 7, and a control element 40. The drive shaft 9 is rotatably mounted in the cranking handle shell 16 and capable of sliding along an axial direction of the drive shaft. An axis of the drive shaft 9 coincides with an axis of the second transmission element 4. One end of the drive shaft 9 is fixedly connected with the second transmission element 4, the second transmission element 4 is clutchably cooperated with the first transmission element 3, and the other end of the drive shaft 9 is connected with the cranking handle 5 and driven by the cranking handle 5 to rotate.

The elastic reset element 7 is capable of driving the drive shaft 9 to slide away from the first transmission element 3 in cooperation with the drive shaft 9, so as to maintain the second transmission element 4 and the first transmission element 3 in a dissociated state.

The control element 40 is configured to control the drive shaft 9 to slide toward the first transmission element 3 so as to maintain the second transmission element 4 and the first transmission element 3 in an associated state.

As shown in FIGS. 12-15, in this embodiment, the control element 40 includes a sliding element 6 and a button 8. The sliding element 6 is slidably mounted in the cranking handle shell 16 and a sliding direction of the sliding element 6 remains the same as a longitudinal direction of the drive shaft 9. The sliding element 6 has a first drive surface 63 disposed obliquely relative to the sliding direction of the sliding element 6. The button 8 is slidably mounted at the cranking handle shell 16. The button 8 has a second drive surface 81 slidably abutted against the first drive surface 63. When provided with force, the button 8 is configured to drive the sliding element 6 to slide. When driven by the button 8, the sliding element 6 cooperates with the drive shaft 9 to drive the drive shaft 9 to slide toward the second transmission element 4.

As shown in FIGS. 12-15, in this embodiment, the sliding element 6 includes a first sliding block 61 and a second sliding block 62. The first sliding block 61 and the second sliding block 62 are enclosed as an annular shape. The sliding element 6 is sleeved on the umbrella rod 15, the first drive surface 63 is located on the first sliding block 61. One side far away from the second transmission element 4 of the drive shaft 9 is abutted against an inside wall of the second sliding block 62. The cranking handle 15 has a rotating axis 51. The rotating axis 51 passes through the second sliding block 62 and then is connected with the drive shaft 9. A side wall of the cranking handle shell 16 has a through-hole 21. The button 8 includes a pressed part 83 and a disengagement prevention part 82. The pressed part 83 is movably disposed in the through-hole 21, the disengagement prevention part 82 is connected to the pressed part 83, and the second drive surface 81 is located on the disengagement prevention part 82.

Figure 12:
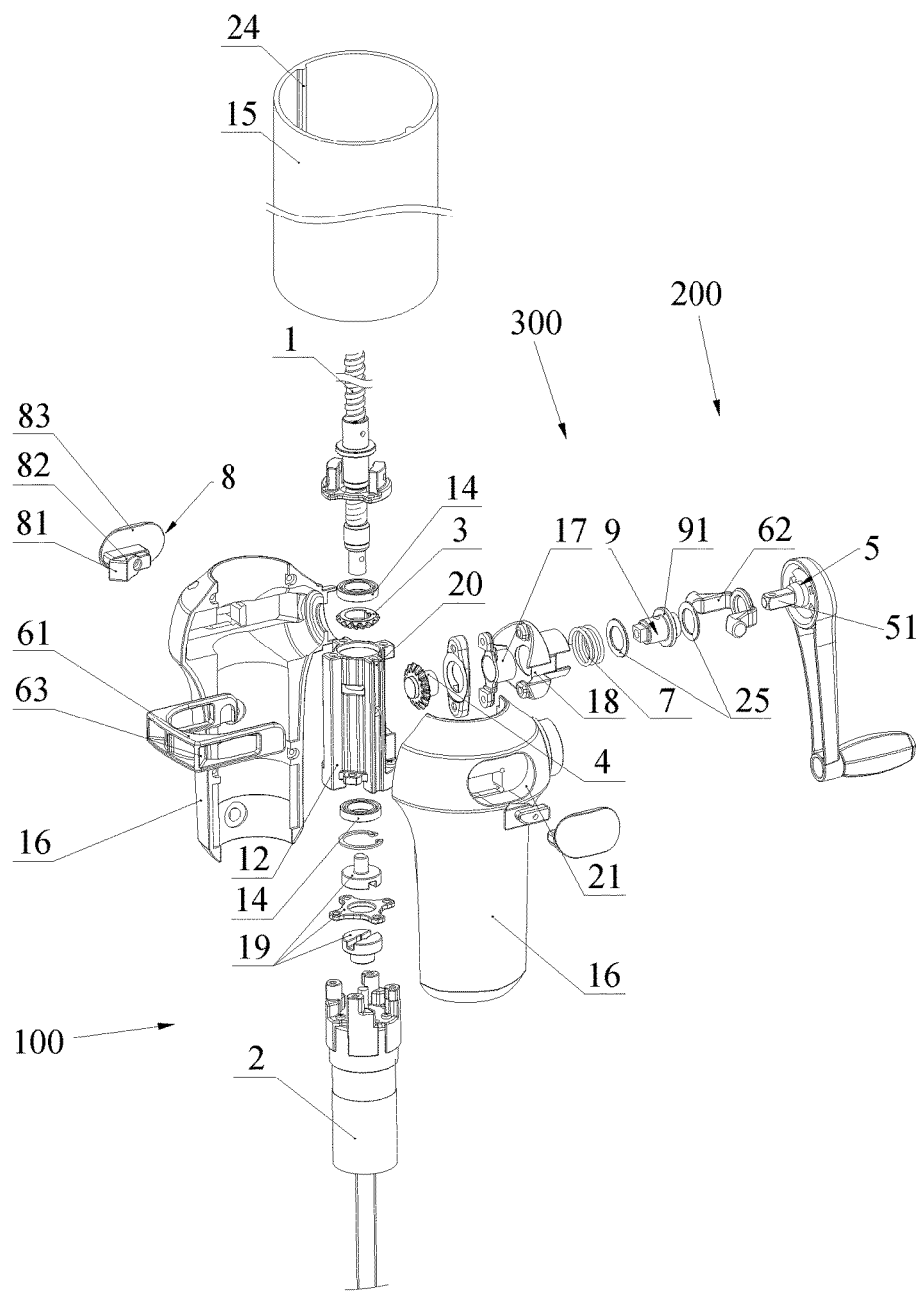
FIG. 12 is an explosive diagram of the opening and closing structure for the umbrella combining automatic and non-automatic modes according Embodiment 3 of the invention.
Figure 13:
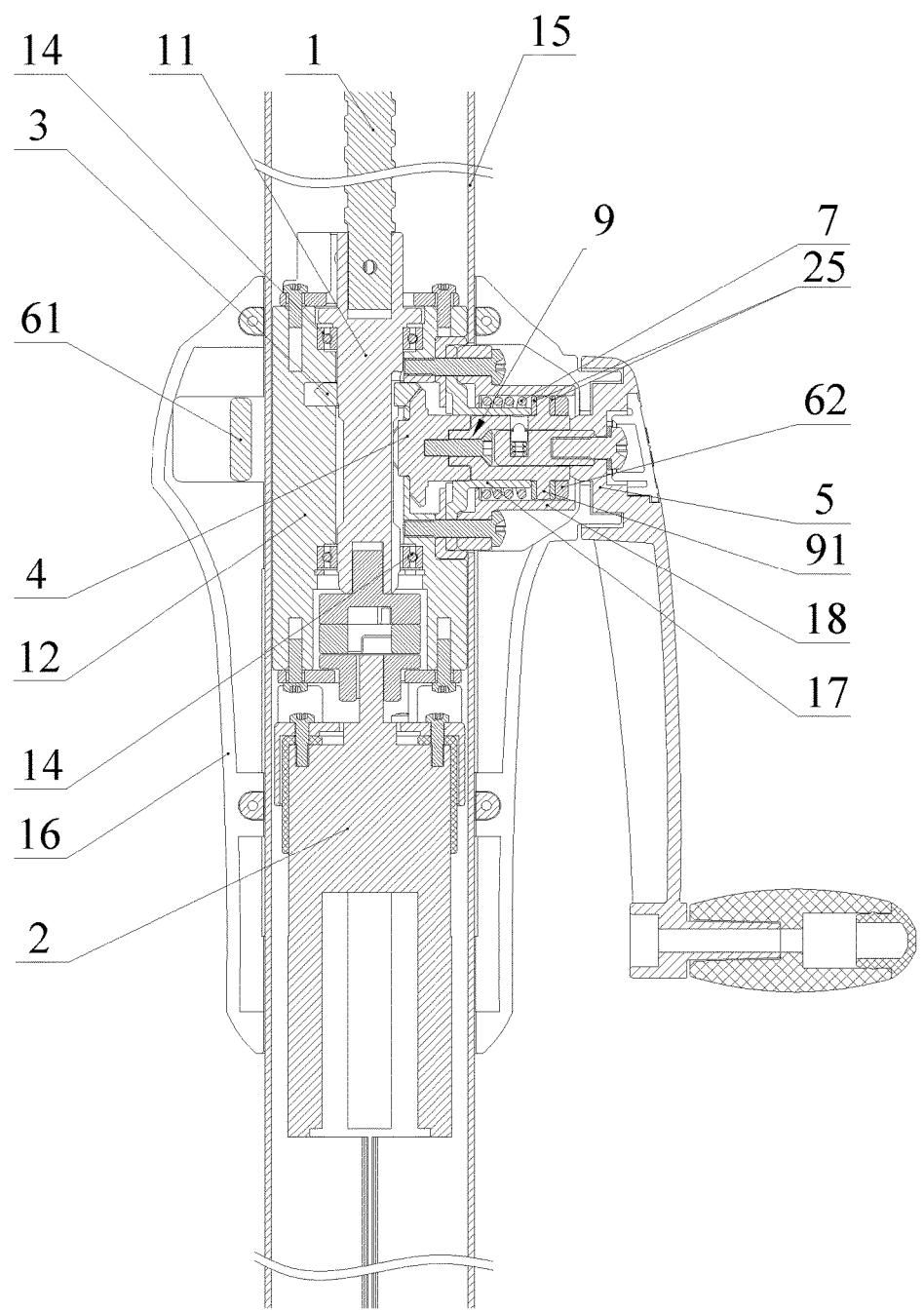
FIG. 13 is a longitudinal section view of the clutch structure of the opening and closing structure for the umbrella combining automatic and non-automatic modes in an associated state according Embodiment 3 of the invention.
Figure 14:
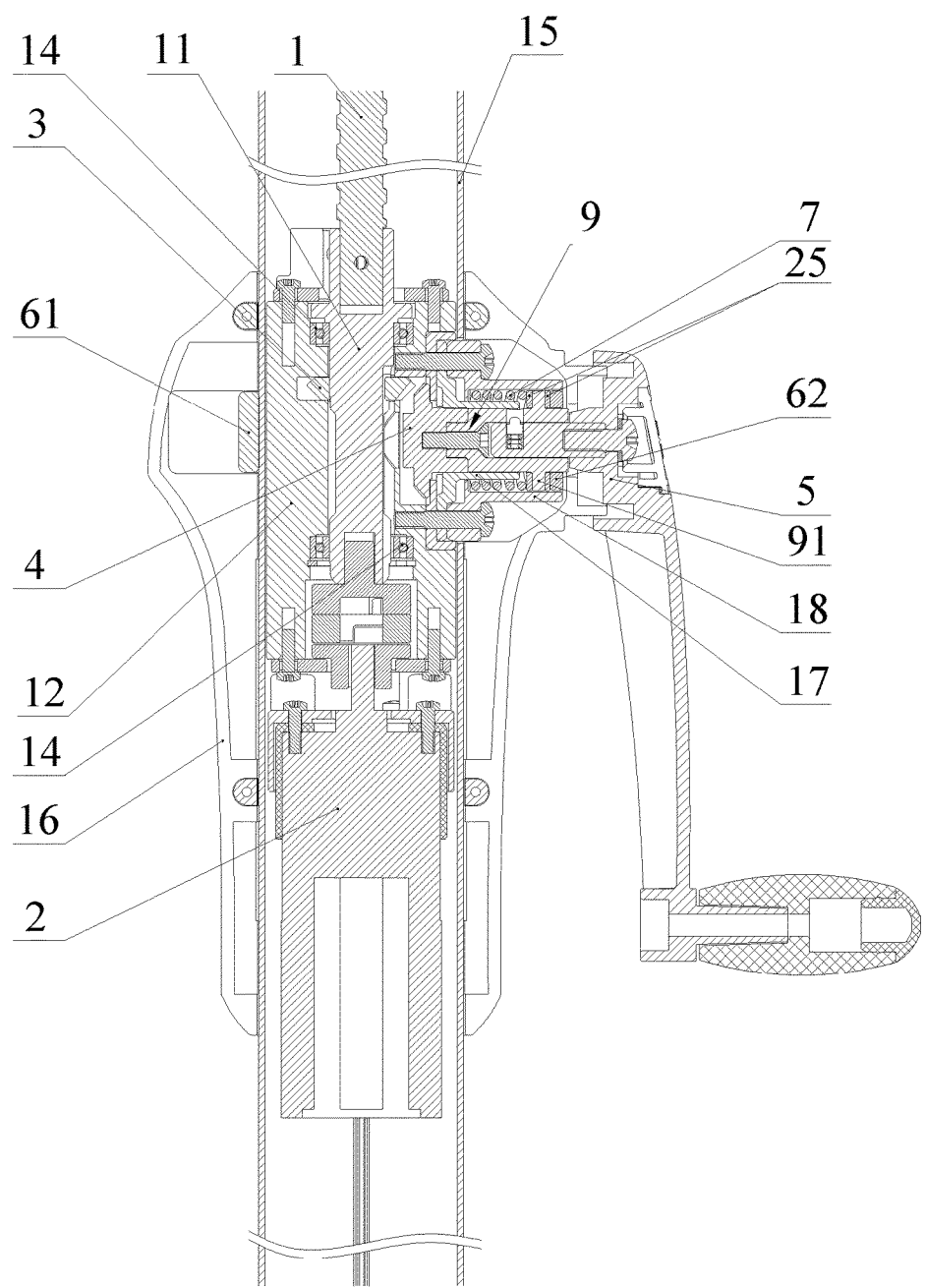
FIG. 14 is a longitudinal section view of the clutch structure of the opening and closing structure for the umbrella combining automatic and non-automatic modes in a dissociated state according Embodiment 3 of the invention.

As shown in FIGS. 12-14, in this embodiment, the screw rod 1 is located in the umbrella rod 15 and disposed along a longitudinal direction of the umbrella rod 15. The electric mechanism 100 further includes a screw rod bearing seat 12, a screw rod connector 11 and a first bearing 14. The screw rod bearing seat 12 and the screw rod connector 11 are disposed between the screw rod 1 and the motor 2. An upper end of the screw rod connector 11 is fixedly connected with the screw rod 1, and a lower end of the screw rod connector 11 is connected with the motor 2. The screw rod connector 11 is rotatably mounted at the screw rod bearing seat 12 via the first bearing 14.

The cranking mechanism 200 further includes a first bearing seat 17 and a second bearing seat 18. The first bearing seat 17 and the second bearing seat 18 are successively fixedly connected to a side wall of the screw rod bearing seat 12. The second bearing seat 18 is sleeved on the first bearing seat 17, and the drive shaft 9 is interspersed in the first bearing seat 17 and the second bearing seat 18. A side wall of the drive shaft 9 has a positioning convex edge 91, and the second sliding block 62 is abutted against the positioning convex edge 91. The elastic reset element 7 is a reset spring. The elastic reset element 7 is sleeved on the first bearing seat 17 and located in the second bearing seat 18. One end of the elastic reset element 7 is abutted against the positioning convex edge 91 of the drive shaft 9, and the other end of the elastic reset element 7 is abutted against the second bearing seat 18.

The first bearing seat 17 and the second bearing seat 18 can be separate parts mounted in the cranking handle shell 16 or be formed by the side wall of the cranking handle shell 16.

Figure 15:
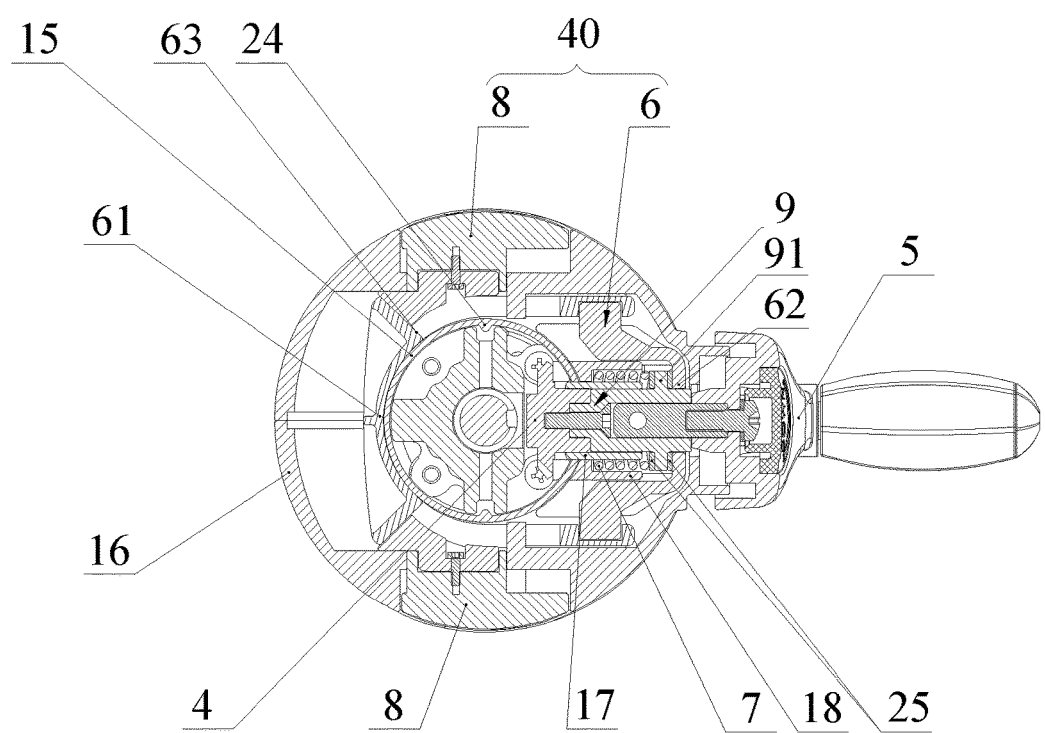
FIG. 15 is a cross-section view of the clutch structure of the opening and closing structure for the umbrella combining automatic and non-automatic modes in a dissociated state according Embodiment 3 of the invention.

As shown in FIGS. 12 and 15, in this embodiment, the umbrella rod 15 has a rib 24, and the screw rod bearing seat 12 has a recess 20 fit for the rib 24.

In this embodiment, the electric mechanism 100 further includes a coupling 19, the screw rod connector 11 and the motor 2 are connected via the coupling 19. The cranking mechanism 200 further includes spacers 25 disposed at both sides of the positioning convex edge 91.

The working principle of the opening and closing structure for the umbrella in this embodiment is as below. As shown in FIG. 13, when the button 8 is pressed to move into the cranking handle shell 16, the second drive surface 81 of the button 8 contacts the first drive surface 63 of the first sliding block 61 so as to push the first sliding block 61 to move in a direction away from the cranking handle 5. The first sliding block 61 and the second sliding block 62 are connected to drive the second sliding block 62 to move together with the first sliding block 61, and meanwhile the second sliding block 62 drives the drive shaft 9 to compress the elastic reset element 7. The drive shaft 9 is fixedly connected to the second transmission element 4, so that the second transmission element 4 is driven to move and engaged with the first transmission element 3. The rotating axis 51 of the cranking handle 5 and the drive shaft 9 are connected and the cranking handle 5 is also pressed to move into the cranking handle shell 16, so that the cranking handle 5 is rotated to drive the drive shaft 9 and the second transmission element 4 to rotate together. The second transmission element 4 and the first transmission element 3 are engaged, so that the first transmission element 3 rotates simultaneously, and thus realizing a manual opening of the umbrella. As shown in FIG. 14, when the button 8 is released, that is, without pressing the button 8, the elastic reset element 7 returns to an original state by its elastic force, and the second transmission element 4 and the first transmission element 3 are separated. The disengagement prevention part 82 of the button 8 can prevent the button 8 from being disengaged from the through-hole 21, in this case, rotating the cranking handle 5 cannot drive the screw rod 1 to rotate, so that the screw rod 1 can realize an automatic opening and closing of the umbrella, driven by the motor 2. In this embodiment, the two lifting-and-lowering modes can be enabled via the clutch structure 300 without interrupting each other.

In this embodiment, the screw rod 1 is configured to connected an umbrella's inner tube, a top of the inner tube can be connected with an upper plate of the umbrella. When the screw rod 1 rotates, the inner tube is lifted and lowered, and drives the upper plate of the umbrella to rise and fall, so as to realize opening and closing of the umbrella. The screw rod 1 is also configured to connect a lower plate of the umbrella. When the lower plate of the umbrella is lifted and lowered with rotation of the screw rod 1, the umbrella can be opened and closed.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An opening and closing structure for an umbrella combining automatic and non-automatic modes, comprising an electric mechanism (100), a cranking mechanism (200) and a clutch structure (300), wherein the electric mechanism (100) and the cranking mechanism (200) are configured to open and close the umbrella, respectively, the electric mechanism (100) comprises a screw rod (1), a motor (2) and a first transmission element (3), the motor (2) is configured to drive rotation of the screw rod (1), the first transmission element (3) is mounted at the screw rod (1), the cranking mechanism (200) comprises a second transmission element (4) and a cranking handle (5), the second transmission element (4) is engaged with the first transmission element (3), and the second transmission element (4) is connected with the cranking handle (5) via the clutch structure (300);

further comprising a tubular umbrella rod (15), wherein the cranking mechanism (200) further comprises a cranking handle shell (16) mounted on the umbrella rod (15); the first transmission element (3) and the second transmission element (4) are both tapered gears, and the second transmission element (4) is rotatably mounted in the cranking handle shell (16); the clutch structure (300) comprises:

a drive shaft (9), rotatably mounted in the cranking handle shell (16) and capable of sliding along an axial direction of the drive shaft; an axis of the drive shaft (9) coincides with an axis of the second transmission element (4); one end of the drive shaft (9) is clutchably connected with the second transmission element (4), and the other end of the drive shaft (9) is connected with the cranking handle (5) and driven by the cranking handle (5) to rotate;

an elastic reset element (7), capable of driving the drive shaft (9) to slide away from the second transmission element (4) in cooperation with the drive shaft (9) so as to maintain the drive shaft (9) and the second transmission element (4) in a dissociated state; and a control element (40), configured to control the drive shaft (9) to slide toward the second transmission element (4) so as to maintain the drive shaft (9) and the second transmission element (4) in an associated state;

wherein the control element (40) comprises a sliding element (6) and a button (8), the sliding element (6) is slidably mounted in the cranking handle shell (16), and a sliding direction of the sliding element (6) remains the same as a longitudinal direction of the drive shaft (9), the sliding element (6) has a first drive surface (63) disposed obliquely relative to the sliding direction of the sliding element (6), the button (8) is slidably mounted at the cranking handle shell (16), and the botton (8) has a second drive surface (81) slidably abutted against the first drive surface (63); when provided with force, the button (8) is configured to drive the sliding element (6) to slide, and when driven by the button (8), the sliding element (6) cooperates with the drive shaft (9) to drive the drive shaft (9) to slide toward the second transmission element (4).

2. The opening and closing structure for the umbrella combining automatic and non-automatic modes as claimed in claim 1, wherein the sliding element (6) comprises a first sliding block (61) and a second sliding block (62), the first sliding block (61) and the second sliding block (62) are enclosed as an annular shape, the sliding element (6) is sleeved on the umbrella rod (15), the first drive surface (63) is located on the first sliding block (61), one side far away from the second transmission element (4) of the drive shaft (9) is abutted against an inside wall of the second sliding block (62), the cranking handle (5) has a rotating axis (51), the rotating axis (51) passes through the second sliding block (62) and then is connected with the drive shaft (9); a side wall of the cranking handle shell (16) has a through-hole (21), the button (8) comprises a pressed part (83) and a disengagement prevention part (82), the pressed part (83) is movably disposed in the through-hole (21), the disengagement prevention part (82) is connected to the pressed part (83), and the second drive surface (81) is located on the disengagement prevention part (82).

3. The opening and closing structure for the umbrella combining automatic and non-automatic modes as claimed in claim 2, wherein the screw rod (1) is located in the umbrella rod (15) and disposed along a longitudinal direction of the umbrella rod (15), the electric mechanism (100) further comprises a screw rod bearing seat (12), a screw rod connector (11) and a first bearing (14), the screw rod bearing seat (12) and the screw rod connector (11) are disposed between the screw rod (1) and the motor (2), an upper end of the screw rod connector (11) is fixedly connected with the screw rod (1), a lower end of the screw rod connector (11) is connected with the motor (2), and the screw rod connector (11) is rotatably mounted at the screw rod bearing seat (12) via the first bearing (14);

the cranking mechanism (200) further comprises a tapered-gear bearing seat (13), a first bearing seat (17), a second bearing seat (18), and a second bearing (10), the tapered-gear bearing seat (13), the first bearing seat (17) and the second bearing seat (18) are successively fixedly connected to a side wall of the screw rod bearing seat (12), the second bearing (10) is sleeved on the second transmission element (4), and mounted in the tapered-gear bearing seat (13), the second bearing seat (18) is sleeved on the first bearing seat (17), and the drive shaft (9) is interspersed in the first bearing seat (17) and the second bearing seat (18);

a side wall of the drive shaft (9) has a positioning convex edge (91), and the second sliding block (62) is abutted against the positioning convex edge (91);

the elastic reset element (7) is a reset spring, the elastic reset element (7) is sleeved on the first bearing seat (17) and located in the second bearing seat (18), one end of the elastic reset element (7) is abutted against the positioning convex edge (91), and the other end of the elastic reset element (7) is abutted against the second bearing seat (18).

4. The opening and closing structure for the umbrella combining automatic and non-automatic modes as claimed in claim 3, wherein the umbrella rod (15) has a rib (24), and the screw rod bearing seat (12) has a recess (20) fit for the rib (24).

5. The opening and closing structure for the umbrella combining automatic and non-automatic modes as claimed in claim 3, wherein the electric mechanism (100) further comprises a coupling (19), the screw rod connector (11) and the motor (2) are connected via the coupling (19), and the cranking mechanism (200) further comprises spacers (25) disposed at both sides of the positioning convex edge (91).

6. An opening and closing structure for an umbrella combining automatic and non-automatic modes, comprising an electric mechanism (100), a cranking mechanism (200)

and a clutch structure (300), wherein the electric mechanism (100) and the cranking mechanism (200) are configured to open and close the umbrella, respectively, the electric mechanism (100) comprises a screw rod (1), a motor (2) and a first transmission element (3), the motor (2) is configured to drive rotation of the screw rod (1), the first transmission element (3) is mounted at the screw rod (1), the cranking mechanism (200) comprises a second transmission element (4) and a cranking handle (5), the second transmission element (4) is engaged with the first transmission element (3), and the second transmission element (4) is connected with the cranking handle (5) via the clutch structure (300);

further comprising a tubular umbrella rod (15), wherein the cranking mechanism (200) further comprises a cranking handle shell (16) mounted on the umbrella rod (15); the first transmission element (3) is a turbine and the second transmission element (4) is a worm, and the second transmission element (4) is rotatably mounted in the cranking handle shell (16); the clutch structure (300) comprises:

a drive shaft (9), rotatably mounted in the cranking handle shell (16) and capable of sliding along an axial direction of the drive shaft; an axis of the drive shaft (9) coincides with the axis of the second transmission element (4); one end of the drive shaft (9) is clutchably connected with the second transmission element (4), and the other end of the drive shaft (9) is connected with the cranking handle (5) and driven by the cranking handle (5) to rotate;

an elastic reset element (7), capable of driving the drive shaft (9) to slide away from the second transmission element (4) in cooperation with the drive shaft (9), so as to maintain the drive shaft (9) and the second transmission element (4) in a dissociated state;

a control element (40), configured to control the drive shaft (9) to slide toward the second transmission element (4) so as to maintain the drive shaft (9) and the second transmission element (4) in an associated state;

wherein the control element (40) comprises a sliding element (6) and a button (8), the sliding element (6) is slidably mounted in the cranking handle shell (16), the sliding element (6) is located outside the umbrella rod (15), and a sliding direction of the sliding element (6) remains the same as a longitudinal direction of the drive shaft (9), the sliding element (6) has a first drive surface (63) disposed obliquely relative to the sliding direction of the sliding element (6), the button (8) is slidably mounted at the cranking handle shell (16), and the botton (8) has a second drive surface (81) slidably abutted against the first drive surface (63); when provided with force, the button (8) is configured to drive the sliding element (6) to slide, and when driven by the button (8), the sliding element (6) cooperates with the drive shaft (9) to drive the drive shaft (9) to slide toward the second transmission element (4).

7. The opening and closing structure for the umbrella combining automatic and non-automatic modes as claimed in claim 6, wherein the sliding element (6) comprises a first sliding block (61) and a second sliding block (62), the first sliding block (61) and the second sliding block (62) are enclosed as an annular shape, the first drive surface (63) is located on the first sliding block (61), one side far away from the second transmission element (4) of the drive shaft (9) is abutted against an inside wall of the second sliding block (62), the cranking handle (5) has a rotating axis (51), the rotating axis (51) passes through the second sliding block (62), and then is connected with the drive shaft (9); a side wall of the cranking handle shell (16) has a through-hole (21), the button (8) comprises a pressed part (83) and a disengagement prevention part (82), the pressed part (83) is movably disposed in the through-hole (21), the disengagement prevention part (82) is connected to the pressed part (83), and the second drive surface (81) is located on the disengagement prevention part (82).

8. The opening and closing structure for the umbrella combining automatic and non-automatic modes as claimed in claim 7, wherein the screw rod (1) is located in the umbrella rod (15) and disposed along a longitudinal direction of the umbrella rod (15), the electric mechanism (100) further comprises a screw rod bearing seat (12), a screw rod connector (11), and a first bearing (14), the screw rod bearing seat (12) and the screw rod connector (11) are disposed between the screw rod (1) and the motor (2), an upper end of the screw rod connector (11) is fixedly connected with the screw rod (1), a lower end of the screw rod connector (11) is connected with the motor (2), and the screw rod connector (11) is rotatably mounted at the screw rod bearing seat (12) via the first bearing (14);

the cranking mechanism (200) further comprises a first bearing seat (17), and a second bearing seat (18), the first bearing seat (17) and the second bearing seat (18) are disposed in the cranking handle shell (16), the drive shaft (9) is interspersed in the first bearing seat (17) and the second bearing seat (18), and one end of the second transmission element (18) stretches into the first bearing seat (17);

a side wall of the drive shaft (9) has a positioning convex edge (91), and the second sliding block (62) is abutted against the positioning convex edge (91);

the elastic reset element (7) is a reset spring, one end of the elastic reset element (7) is abutted against the positioning convex edge (91) of the drive shaft (9), and the other end of the elastic reset element (7) is abutted against the second bearing seat (18).

9. The opening and closing structure for the umbrella combining automatic and non-automatic modes as claimed in claim 8, wherein the umbrella rod (15) has a rib (24), and the screw rod bearing seat (12) has a recess (20) fit for the rib (24).

10. The opening and closing structure for the umbrella combining automatic and non-automatic modes as claimed in claim 9, wherein the electric mechanism (100) further comprises a coupling (19), the screw rod connector (11) and the motor (2) are connected via the coupling (19), and the cranking mechanism (200) further comprises spacers (25) disposed at both sides of the positioning convex edge (91).

11. An opening and closing structure for an umbrella combining automatic and non-automatic modes, comprising an electric mechanism (100), a cranking mechanism (200) and a clutch structure (300), wherein the electric mechanism (100) and the cranking mechanism (200) are configured to open and close the umbrella, respectively, the electric mechanism (100) comprises a screw rod (1), a motor (2) and a first transmission element (3), the motor (2) is configured to drive rotation of the screw rod (1), the first transmission element (3) is disposed at the screw rod (1), the cranking mechanism (200) comprises a second transmission element (4) and a cranking handle (5), the cranking handle (5) is configured to drive rotation of the second transmission element (4), and the second transmission element (4) is engaged with the first transmission element (3) via the clutch structure (300);

further comprising a tubular umbrella rod (15), wherein the cranking mechanism (200) further comprises a cranking handle shell (16) mounted on the umbrella rod (15); the first transmission element (3) and the second transmission element (4) are both tapered gears, and the second transmission element (4) is rotatably mounted in the cranking handle shell (16); the clutch structure (300) comprises:

a drive shaft (9), rotatably mounted in the cranking handle shell (16) and capable of sliding along an axial direction of the drive shaft; an axis of the drive shaft (9) coincides with an axis of the second transmission element (4); one end of the drive shaft (9) is fixedly connected with the second transmission element (4), the second transmission element (4) is clutchably cooperated with the first transmission element (3), and the other end of the drive shaft (9) is connected with the cranking handle (5) and driven by the cranking handle (5) to rotate;

an elastic reset element (7), capable of driving the drive shaft (9) to slide away from the first transmission element (3) in cooperation with the drive shaft (9), so as to maintain the second transmission element (4) and the first transmission element (3) in a dissociated state; and a control element (40), configured to control the drive shaft (9) to slide toward the first transmission element (3) so as to maintain the second transmission element (4) and the first transmission element (3) in an associated state;

wherein the control element (40) comprises a sliding element (6) and a button (8), the sliding element (6) is slidably mounted in the cranking handle shell (16), and a sliding direction of the sliding element (6) remains the same as a longitudinal direction of the drive shaft (9), the sliding element (6) has a first drive surface (63) disposed obliquely relative to the sliding direction of the sliding element (6), the button (8) is slidably mounted at the cranking handle shell (16), and the botton (8) has a second drive surface (81) slidably abutted against the first drive surface (63); when provided with force, the button (8) is configured to drive the sliding element (6) to slide, and when driven by the button (8), the sliding element (6) cooperates with the drive shaft (9) to drive the drive shaft (9) to slide toward the second transmission element (4).

12. The opening and closing structure for the umbrella combining automatic and non-automatic modes as claimed in claim 11, wherein the sliding element (6) comprises a first sliding block (61) and a second sliding block (62), the first sliding block (61) and the second sliding block (62) are enclosed as an annular shape, the sliding element (6) is sleeved on the umbrella rod (15), the first drive surface (63) is located on the first sliding block (61), one side far away from the second transmission element (4) of the drive shaft (9) is abutted against an inside wall of the second sliding block (62), the cranking handle (5) has a rotating axis (51), the rotating axis (51) passes through the second sliding block (62) and then is connected with the drive shaft (9); a side wall of the cranking handle shell(16) has a through-hole (21), the button (8) comprises a pressed part (83) and a disengagement prevention part (82), the pressed part (83) is movably disposed in the through-hole (21), the disengagement prevention part (82) is connected to the pressed part (83), and the second drive surface (81) is located on the disengagement prevention part (82).

13. The opening and closing structure for the umbrella combining automatic and non-automatic modes as claimed in claim 12, wherein the screw rod (1) is located in the umbrella rod (15) and disposed along a longitudinal direction of the umbrella rod (15), the electric mechanism (100) further comprises a screw rod bearing seat (12), a screw rod connector (11), and a first bearing (14), the screw rod bearing seat (12) and the screw rod connector (11) are disposed between the screw rod (1) and the motor (2), an upper end of the screw rod connector (11) is fixedly connected with the screw rod (1), and a lower end of the screw rod connector (11) is connected with the motor (2), and the screw rod connector (11) is rotatably mounted at the screw rod bearing seat (12) via the first bearing (14);

the cranking mechanism (200) further comprises a first bearing seat (17) and a second bearing seat (18), the first bearing seat (17) and the second bearing seat (18) are successively fixedly connected to a side wall of the screw rod bearing seat (12), the second bearing seat (18) is sleeved on the first bearing seat (17), and the drive shaft (9) is interspersed in the first bearing seat (17) and the second bearing seat (18);

a side wall of the drive shaft (9) has a positioning convex edge (91), and the second sliding block (62) is abutted against the positioning convex edge (91);

the elastic reset element (7) is a reset spring, the elastic reset element (7) is sleeved on the first bearing seat (17) and located in the second bearing seat (18), one end of the elastic reset element (7) is abutted against the positioning convex edge (91) of the drive shaft (9), and the other end of the elastic reset element (7) is abutted against the second bearing seat (18).

14. The opening and closing structure for the umbrella combining automatic and non-automatic modes as claimed in claim 13, wherein the umbrella rod (15) has a rib (24), and the screw rod bearing seat (12) has a recess (20) fit for the rib (24).

15. The opening and closing structure for the umbrella combining automatic and non-automatic modes as claimed in claim 13, wherein the electric mechanism (100) further comprises a coupling (19), the screw rod connector (11) and the motor (2) are connected via the coupling (19), and the cranking mechanism (200) further comprises spacers (25) disposed at both sides of the positioning convex edge (91).

* * * * *